(12) United States Patent
Bifulco

(10) Patent No.: US 6,257,132 B1
(45) Date of Patent: *Jul. 10, 2001

(54) METHOD AND APPARATUS FOR PREPARING MEAT

(76) Inventor: Phil Bifulco, 1147 SW. 1st Way, Deerfield Beach, FL (US) 33441

( * ) Notice: Subject to any disclaimer, the term of this patent is extended or adjusted under 35 U.S.C. 154(b) by 0 days.

This patent is subject to a terminal disclaimer.

(21) Appl. No.: 09/246,682

(22) Filed: Feb. 8, 1999

Related U.S. Application Data

(63) Continuation-in-part of application No. 09/122,737, filed on Jul. 27, 1998, now abandoned.

(51) Int. Cl.[7] ........................................... B30B 3/04
(52) U.S. Cl. ..................... 100/161; 99/349; 100/168; 100/172; 100/173; 100/176; 100/910; 452/142
(58) Field of Search ..................... 100/161, 162 R, 100/163 R, 171, 172, 173, 176, 210, 910, 168, 169, 155 R; 99/349, 353; 219/244; 452/142, 174

(56) References Cited

U.S. PATENT DOCUMENTS

| | | |
|---|---|---|
| Re. 10,965 * | 10/1888 | Oliver ................................. 100/173 |
| 320,848 | 6/1885 | Cathcart . |
| 1,691,361 | 11/1928 | Roberts . |
| 2,135,960 | 11/1938 | Campbell . |
| 2,243,492 | 5/1941 | Wilson . |
| 2,718,028 | 9/1955 | Read et al. . |
| 3,291,036 | 12/1966 | Perl . |
| 3,716,893 | 2/1973 | Vogelsang . |
| 3,951,059 | 4/1976 | Morris . |
| 4,085,482 | 4/1978 | Charron . |
| 4,261,257 | 4/1981 | Henderson et al. . |
| 4,467,497 | 8/1984 | Peterson et al. . |
| 4,488,480 | 12/1984 | Miller et al. . |
| 4,574,771 | 3/1986 | Gutekunst . |
| 5,114,379 | 5/1992 | Prosenbauer . |
| 5,850,786 | 12/1998 | Bifulco . |

FOREIGN PATENT DOCUMENTS

| | | |
|---|---|---|
| 0053656 | 6/1982 | (EP) . |
| 463676 | 5/1951 | (IT) . |
| 358218 | 12/1972 | (SU) . |

* cited by examiner

Primary Examiner—Stephen F. Gerrity
(74) Attorney, Agent, or Firm—Oltman, Flynn & Kubler

(57) ABSTRACT

A meat preparing machine having two vertically stacked columns of two or more non-sharpened edge stainless steel rollers, or of various other materials such as plastic or aluminum, adjacent to one another in an aluminum or stainless steel frame. The stacked rollers are configured to tenderize, flatten, scrape or cut the meat into strips. Four threaded shafts with numbers connect each corner of the stacked rollers to an adjacent corner of the other stacked rollers to allow for the adjustment of the spacing between the stacked rollers. A first conveyor belt with scraper at the end to discharge meat into the first and second columns is mounted adjacent the top of the rollers for feeding the meat into the rollers. A second conveyor belt with scrapers to discharge meat is mounted adjacent the bottom of the rollers for retrieving the prepared meat from the machine. The second conveyor belt has an adjustable, weighted finisher roller with scraper structured to further reduce the thickness and remove any coarse texture in the product. Removing the motor, conveyor belts and rollers allows the remaining components to be submerged in water for cleaning. A removable cover includes a bump guard to prevent the motor start/stop switch from being accidentally activated. Magnetically operated safety switches prevent activation without the cover and top conveyor in place.

32 Claims, 29 Drawing Sheets

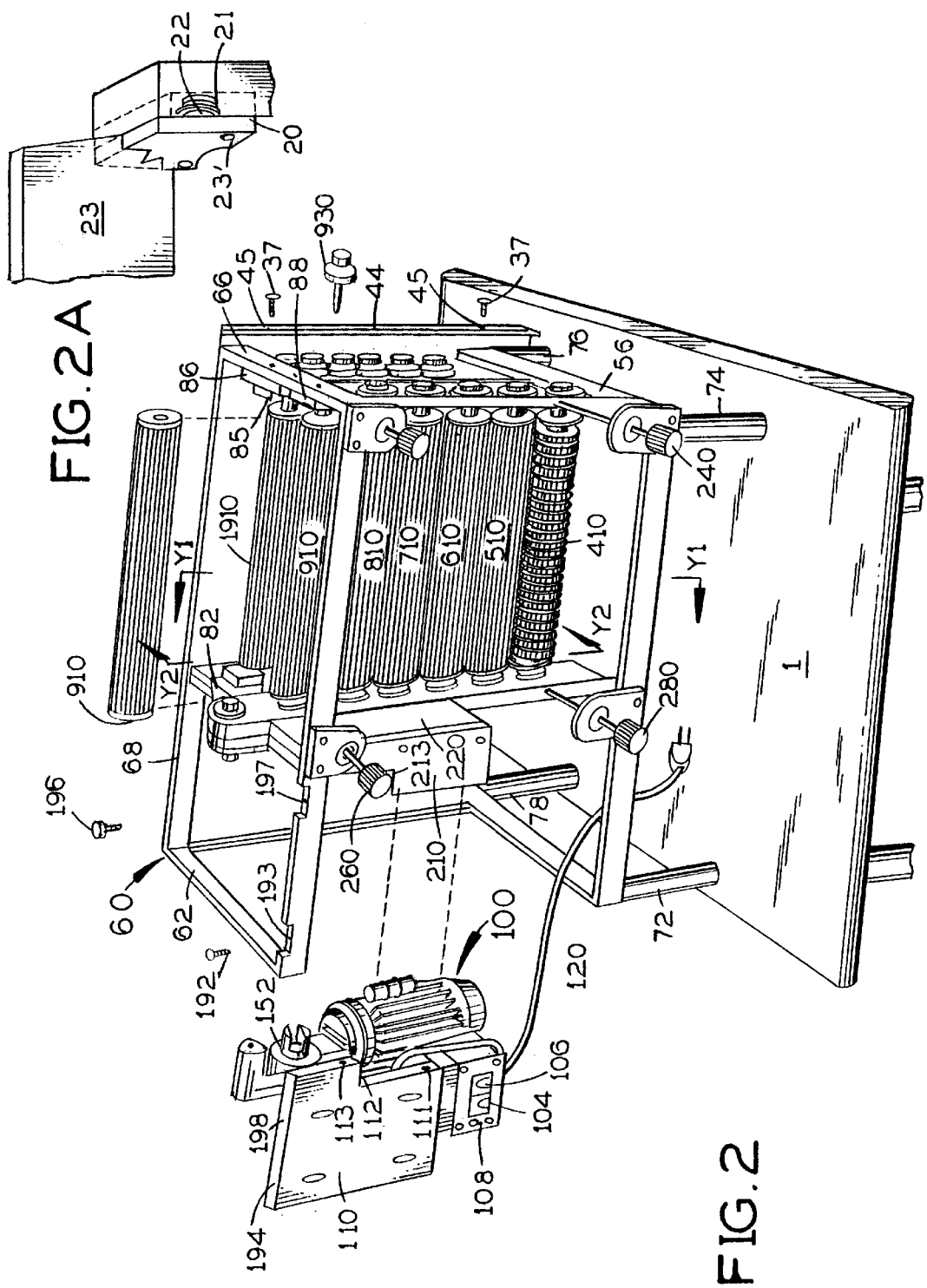

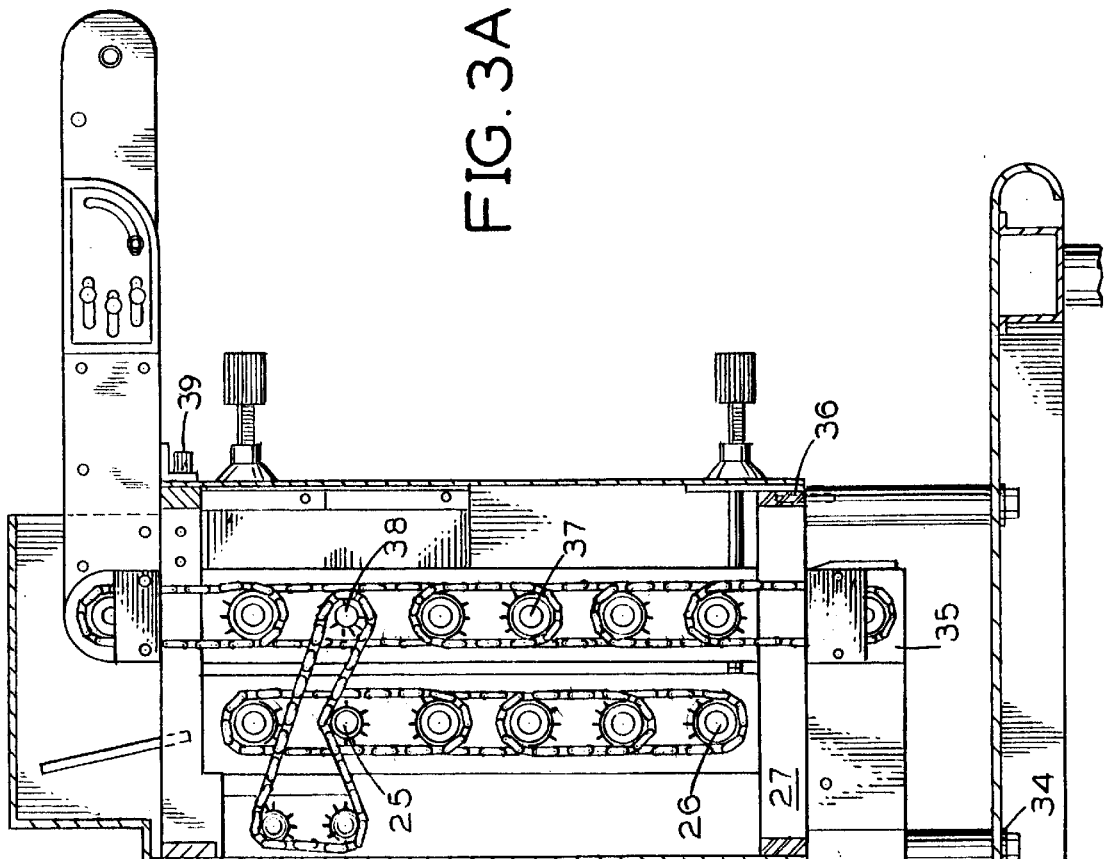
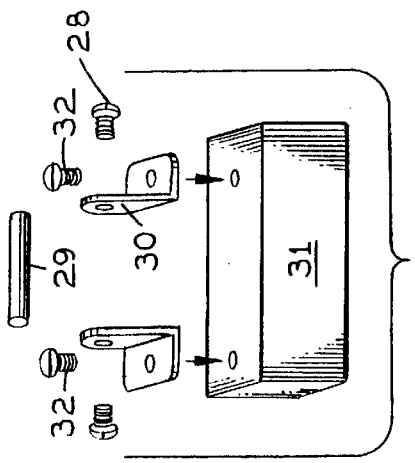
FIG. 3A
FIG. 3C

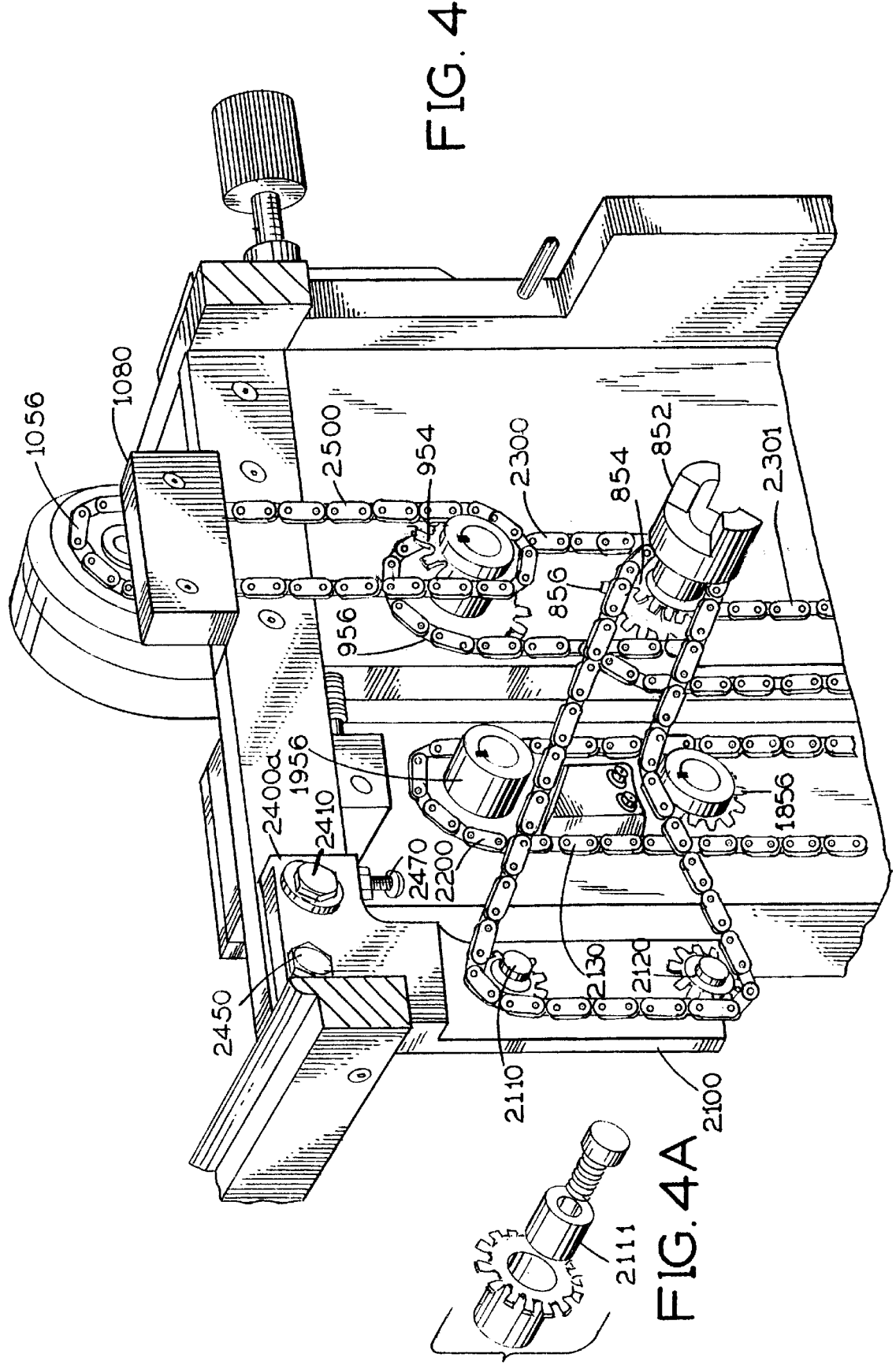

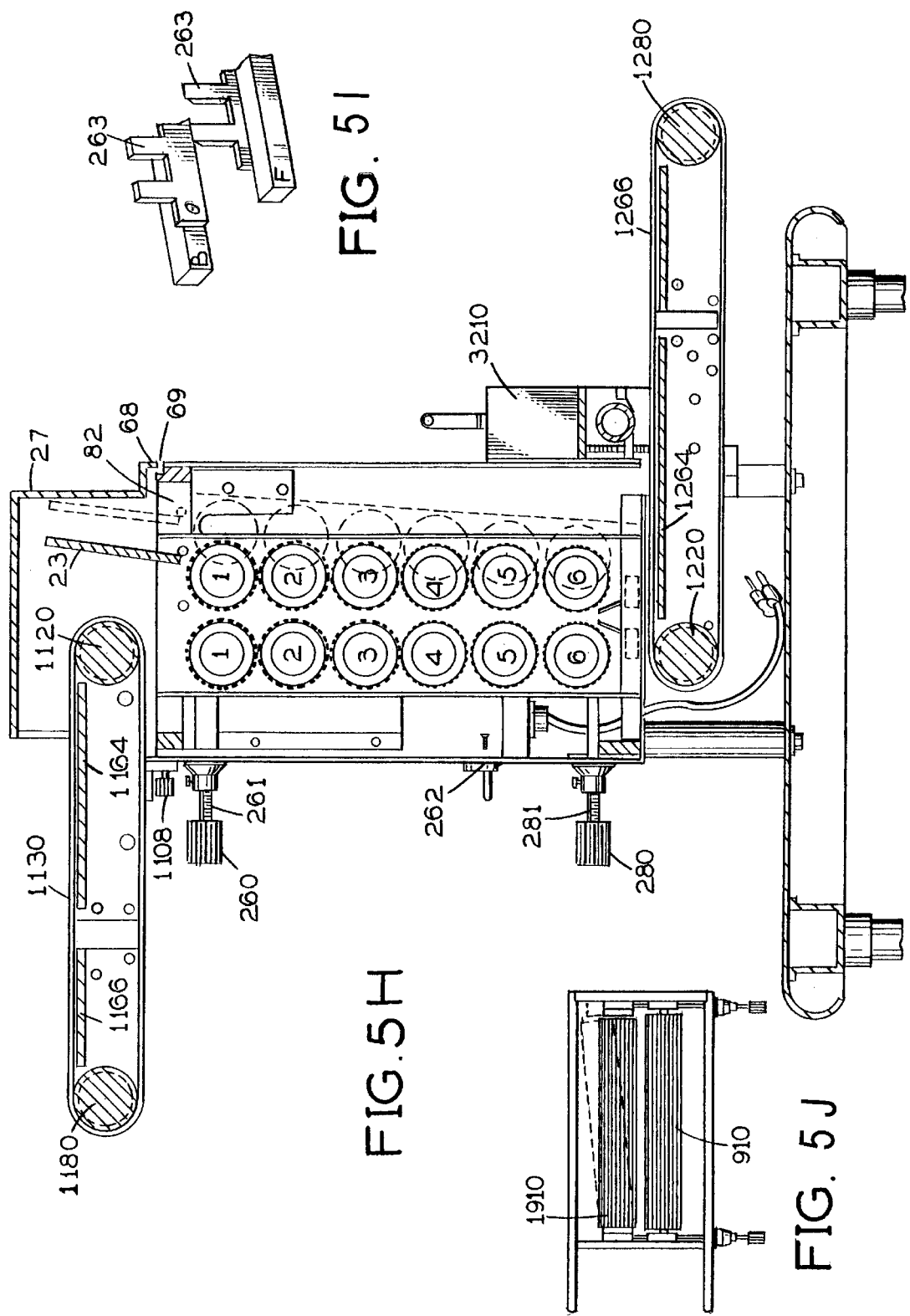

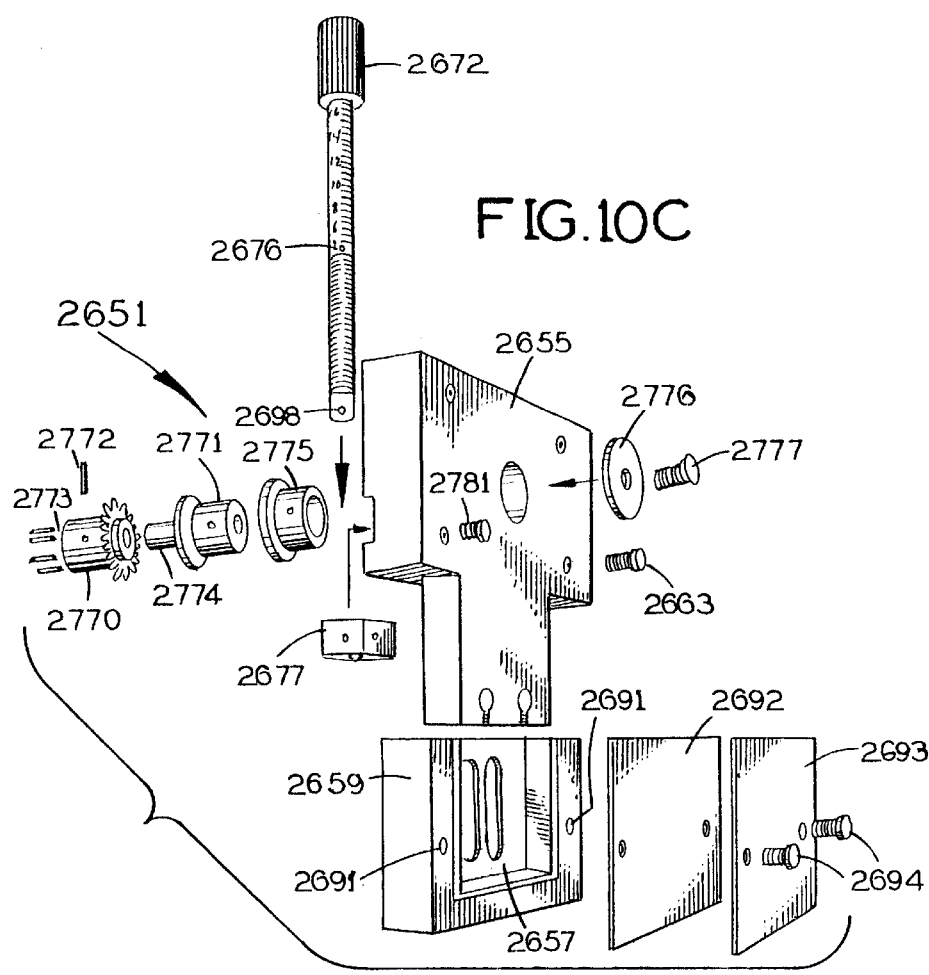
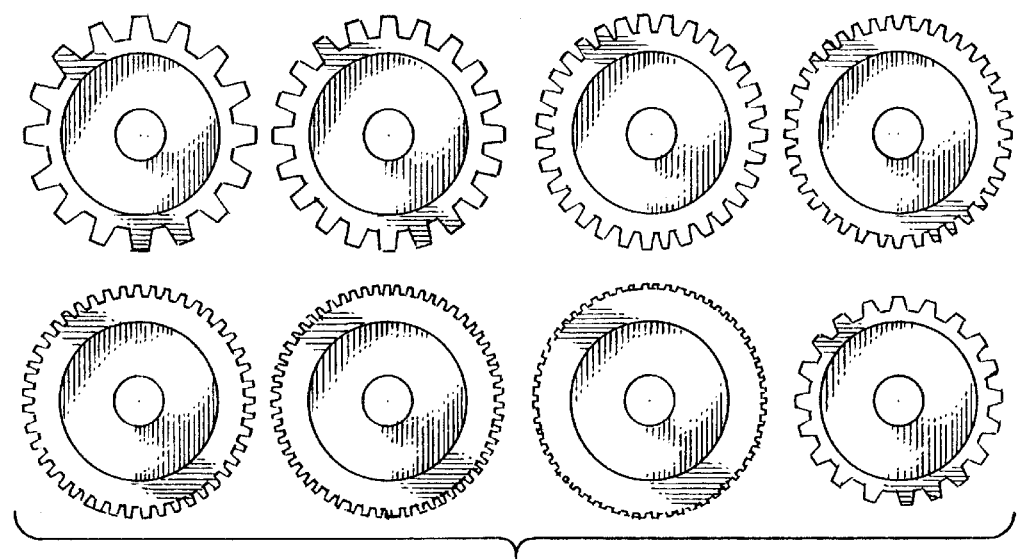

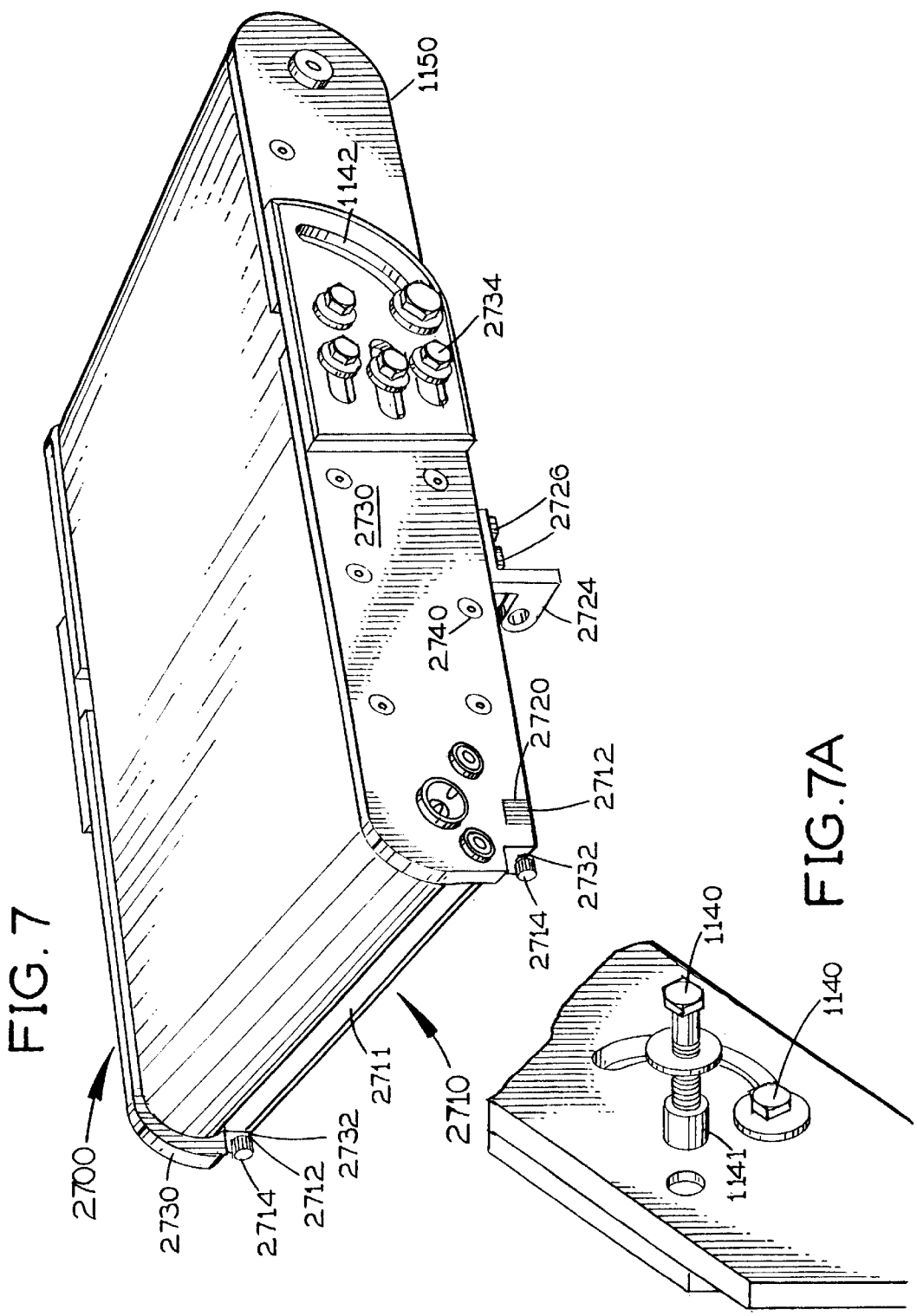

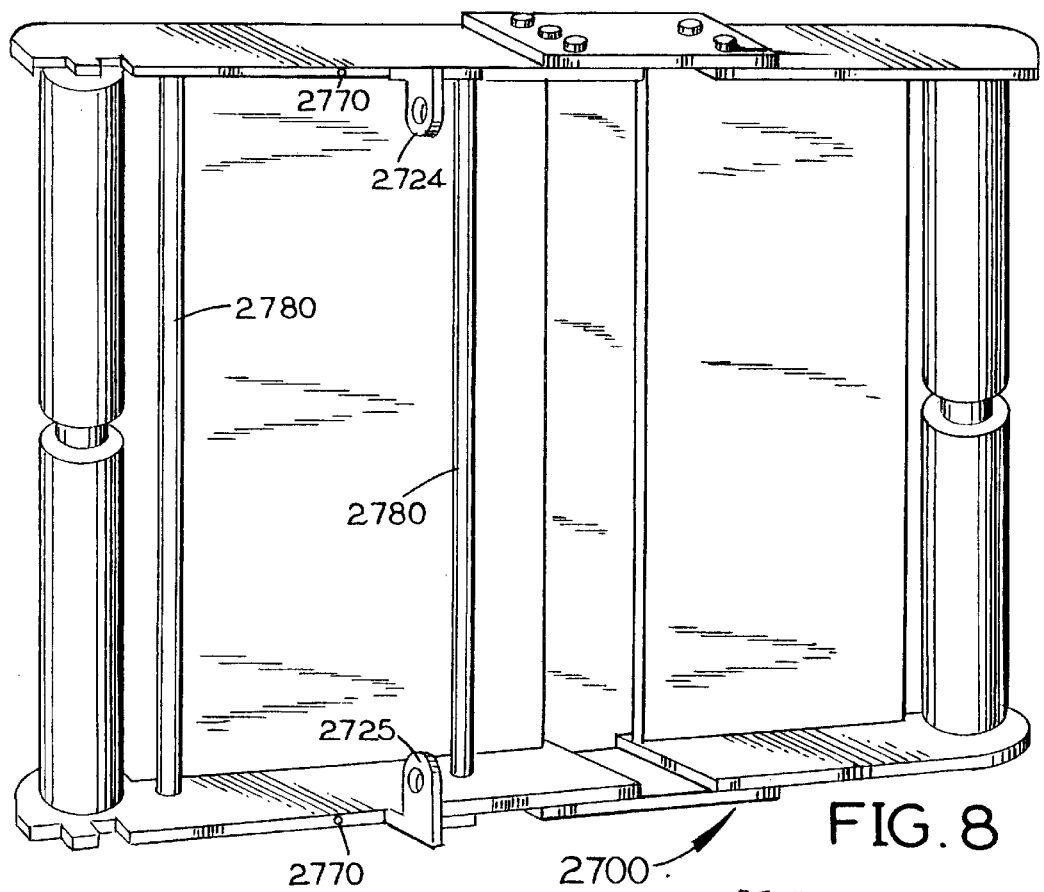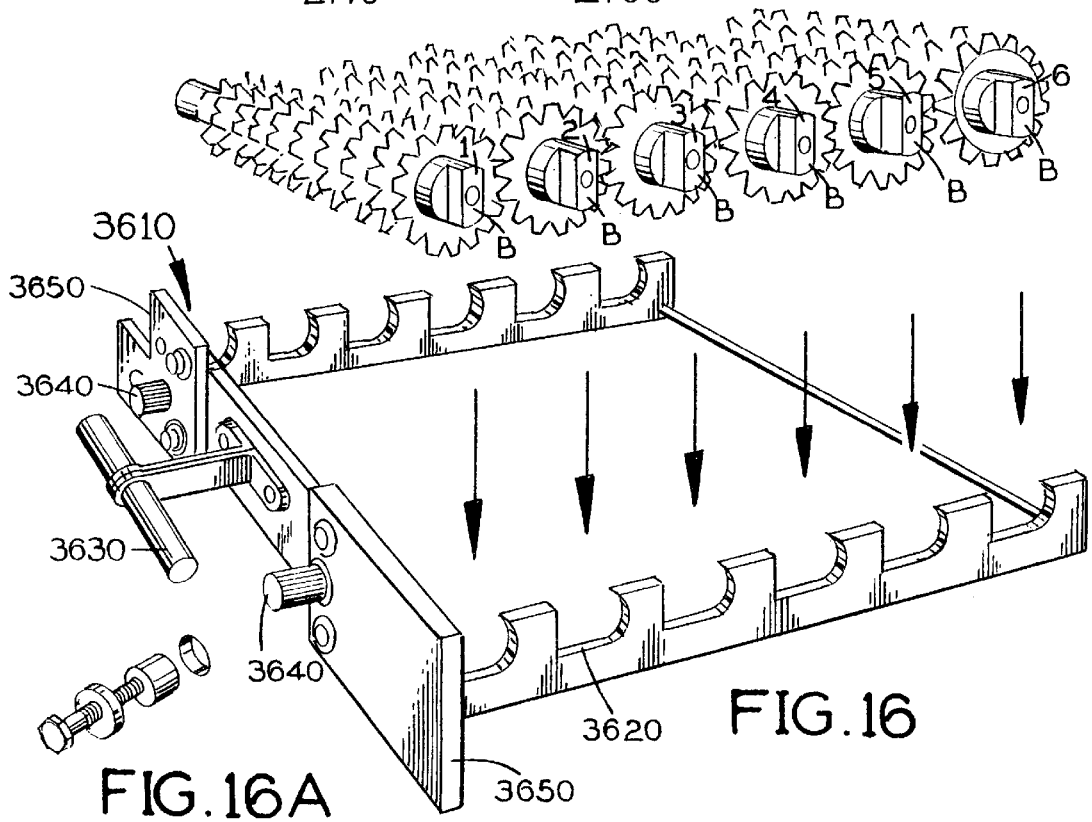

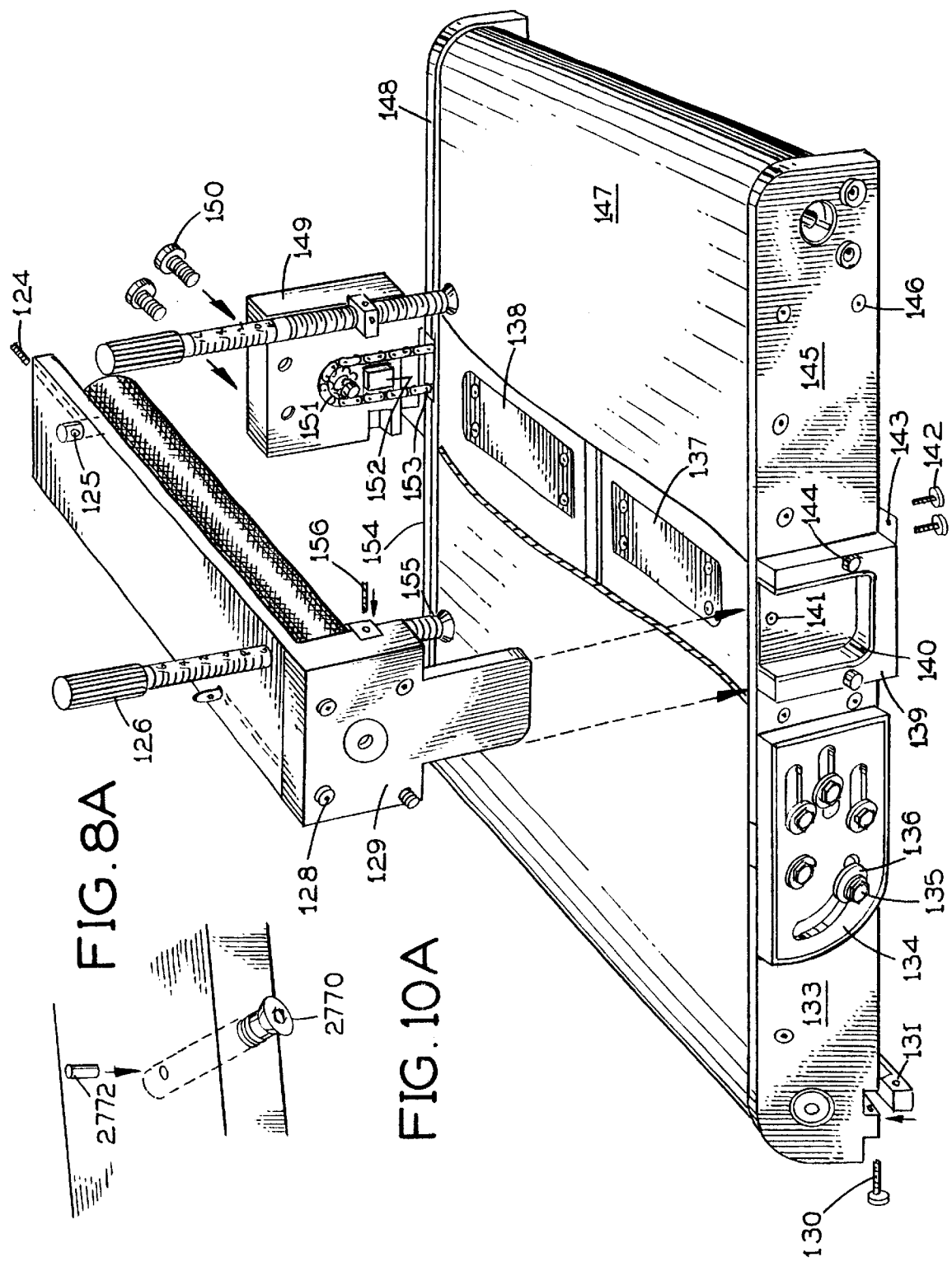

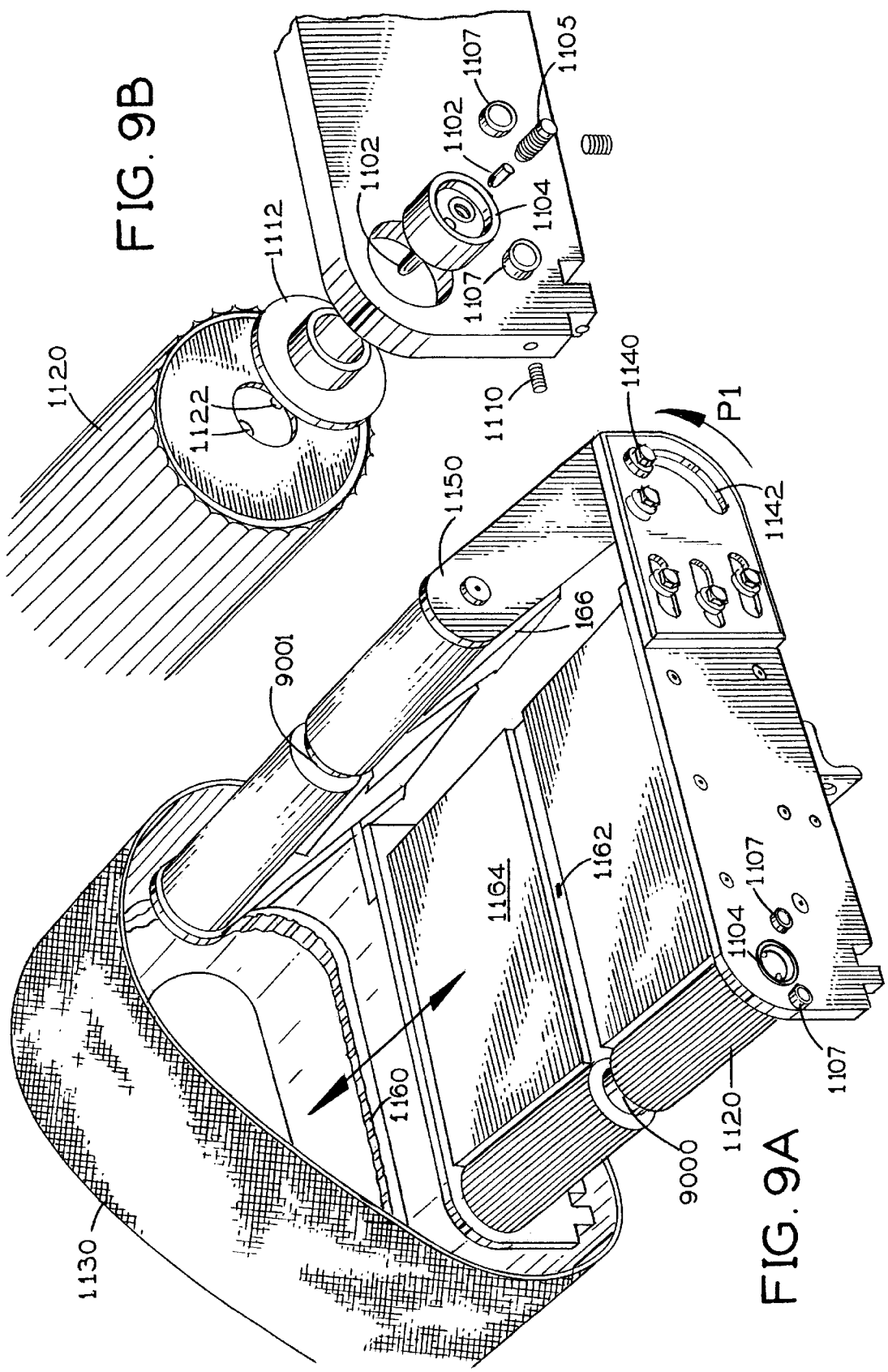

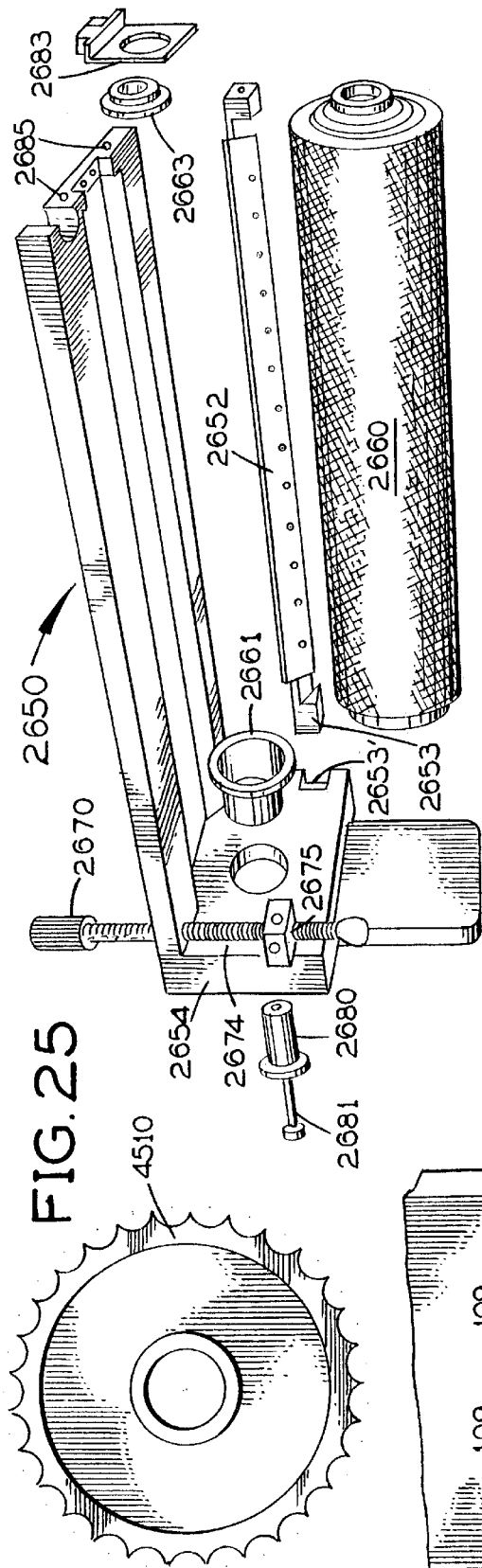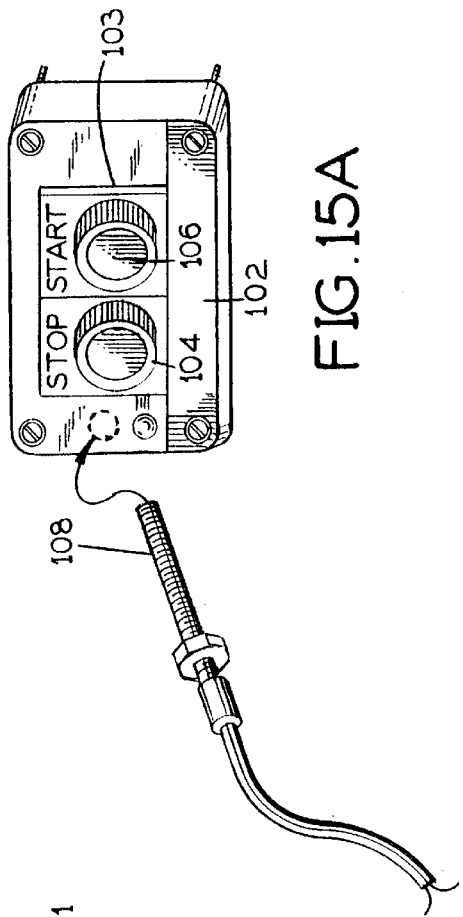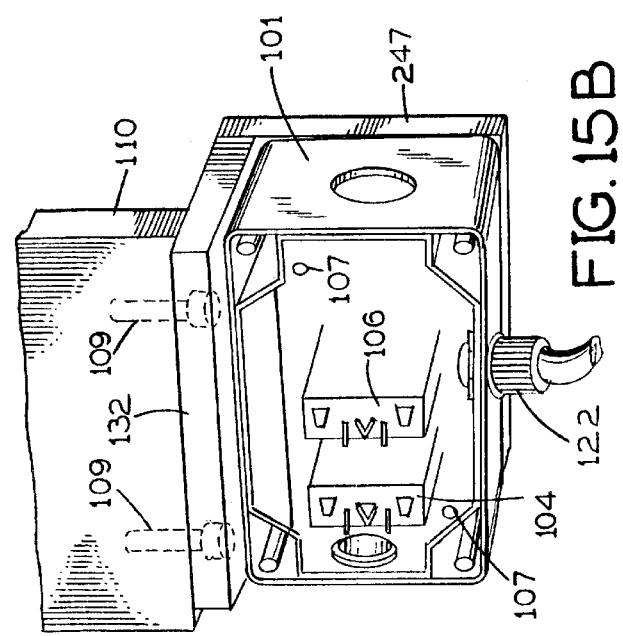

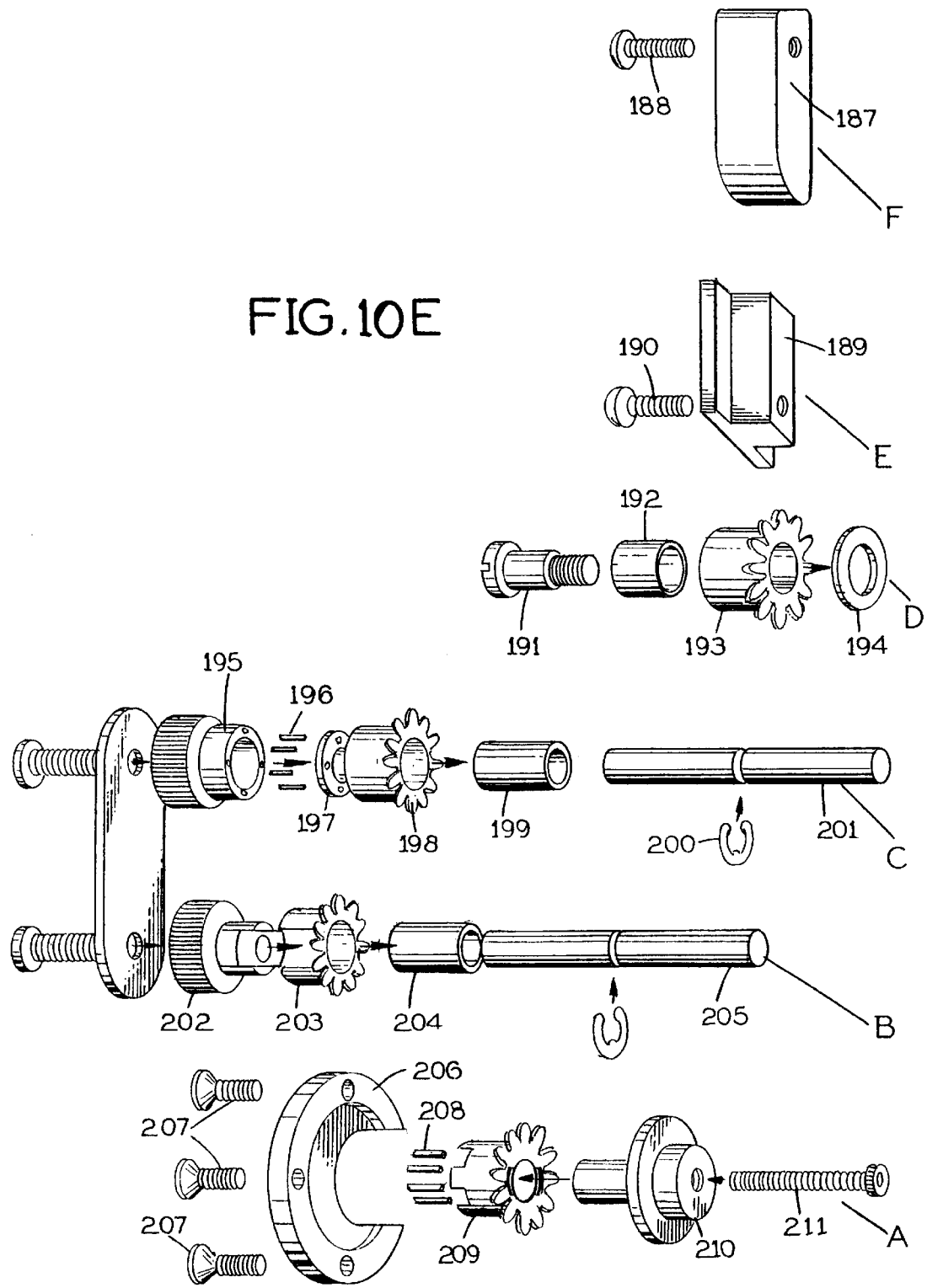

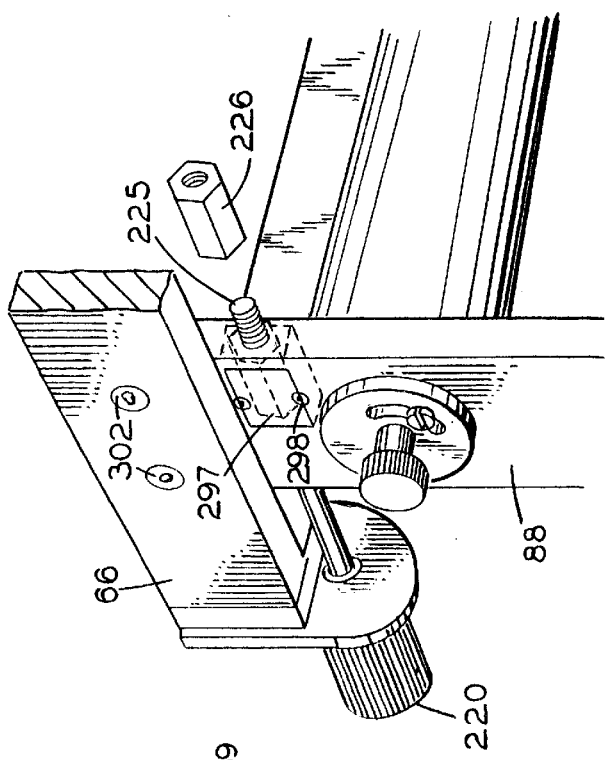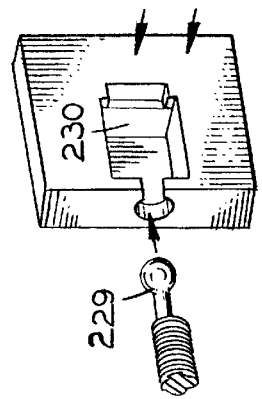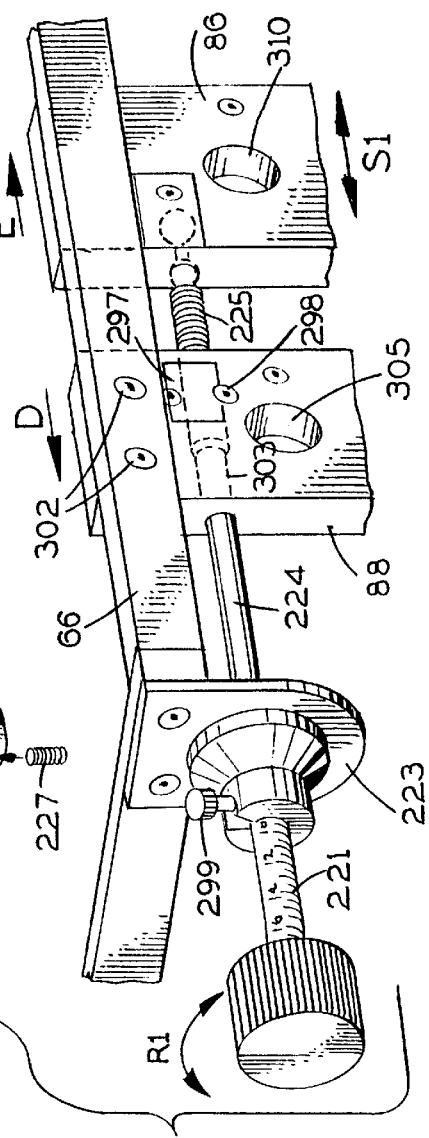

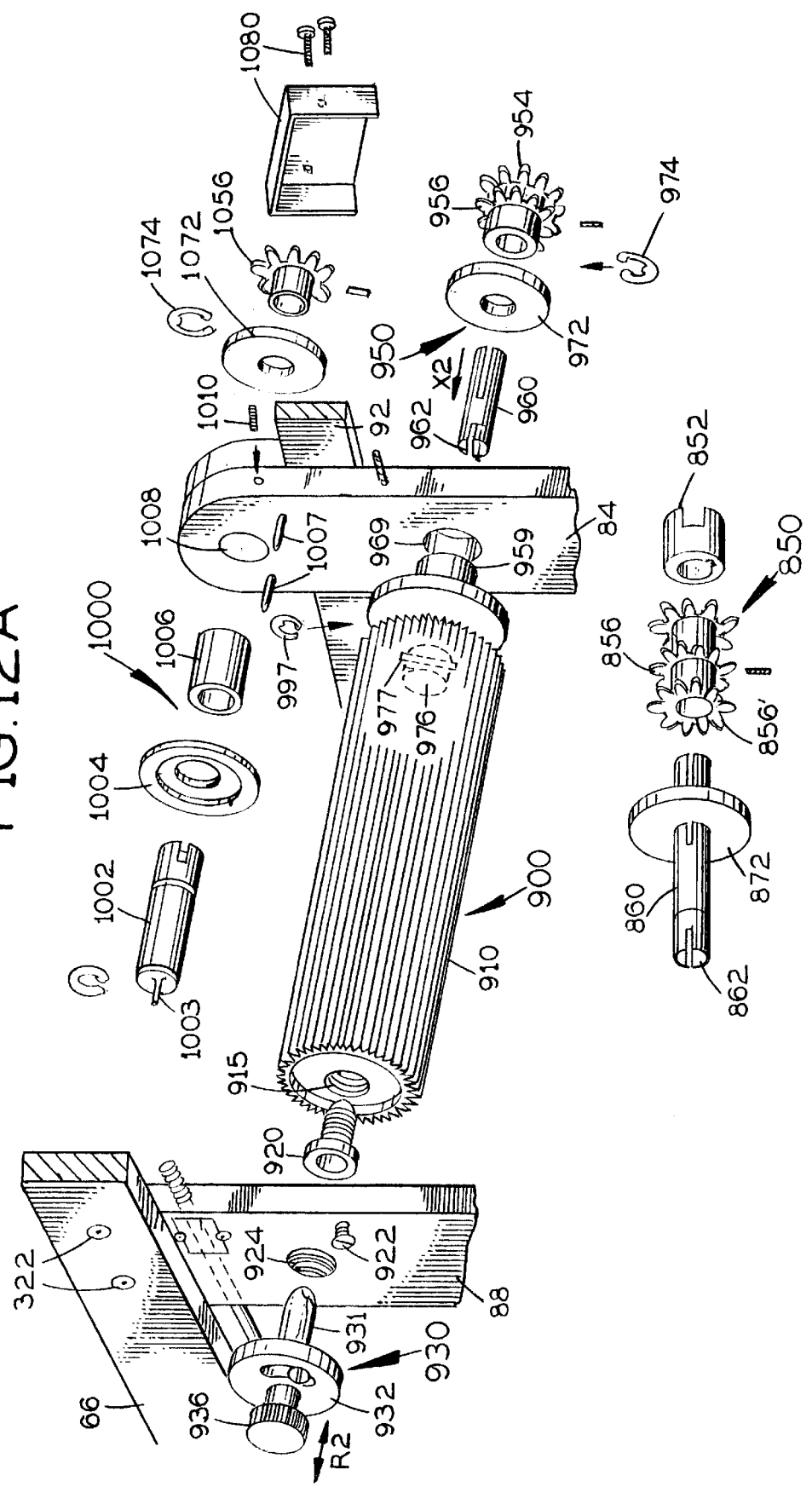

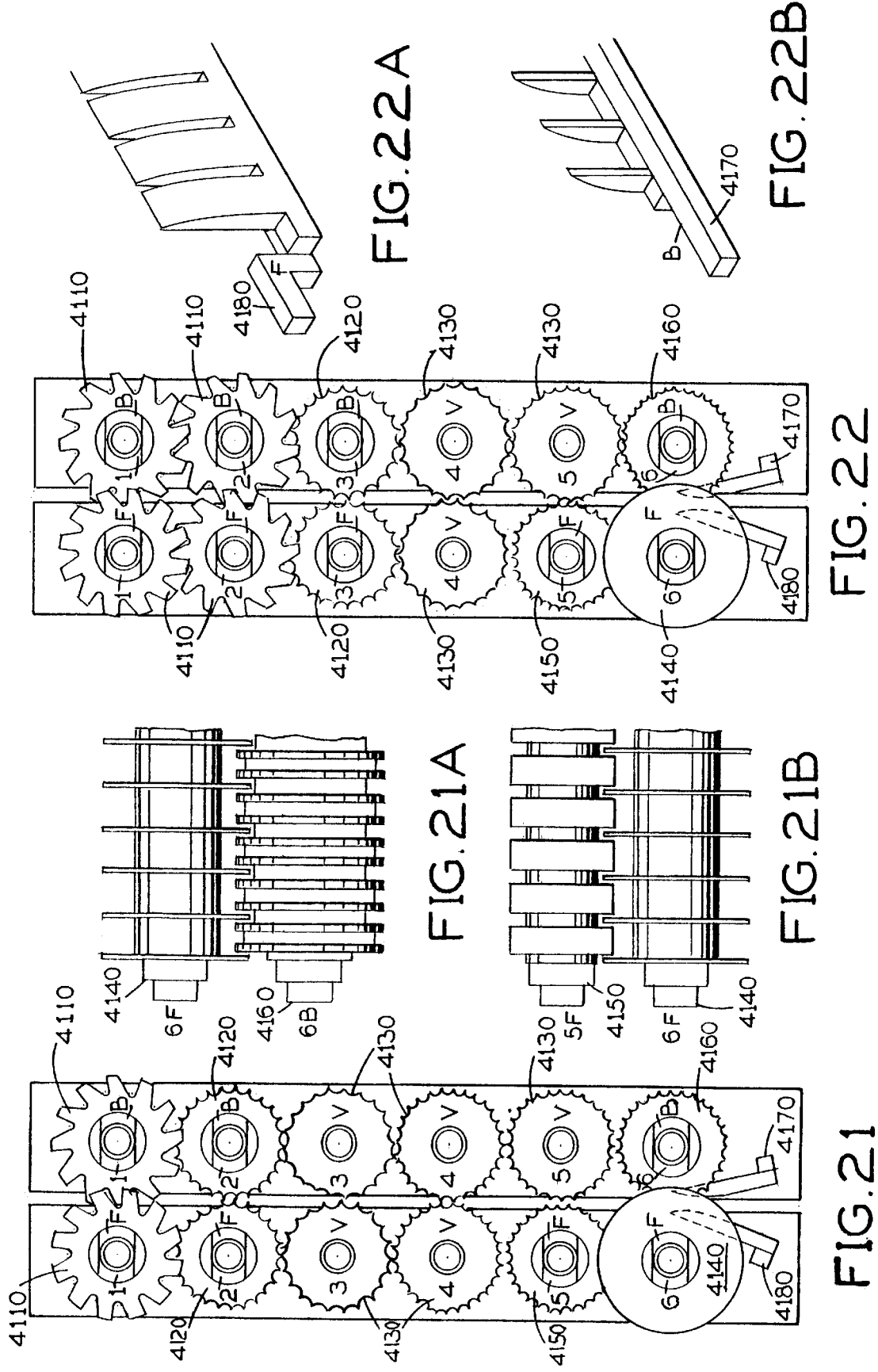

METHOD AND APPARATUS FOR PREPARING MEAT

This is a continuation-in-part of application Ser. No. 09/122,737, filed Jul. 27, 1998, which has been abandoned.

This invention relates to a meat preparing device, and in particular to a method and apparatus for progressively flattening meat or pressing two or more meats together to become one piece, changing or controlling the shape of the product, repairing holes in damaged product, and displacing a thick portion of meat into a thin portion making consistent thickness throughout. It also relates to making a coarse texture on a product, allowing a greater percentage of bread and batter to adhere to product, and making meat more tender by breaking down muscle fiber.

The meat includes veal, poultry, beef, pork, lamb, goat, buffalo, horse, ostrich, venison, fish fillets and various other meats. This machine has two vertical stacked rows of rollers wherein the two stacks are parallel to one another and the meats are passed through the space between the rows.

BACKGROUND AND PRIOR ART

Basic techniques for preparing meat have generally required butchers and food preparers to handle the meat with their hands. Such handling has inherent sanitation problems and the like. Furthermore, such physical handling does not result in a uniform flatness which can be necessary in order to allow for the meat to have a consistent cooking time for all areas of the meat allowing the meat to be cooked evenly, and a final aesthetic plate appearance. Similar problems exist for preparing chicken, veal, beef, pork, lamb, goat, buffalo, and venison, fish fillets, horse, ostrich and various other meats.

Several patents have attempted to tenderize meat in rolling machines but still do not overcome the problems presented above. See for example U.S. Pat. No. 2,135,960 to Campbell; U.S. Pat. No. 2,243,492 to Wilson; U.S. Pat. No. 2,718,028 to Read et al.; U.S. Pat. No. 3,716,893 to Vogelsang; and U.S. Pat. No. 4,085,893 to Charron. The tenderizer type machines pierce and penetrate meat and further cause the meat to be chopped up into separate pieces. None of the prior art overcomes the problems presented above.

SUMMARY OF THE INVENTION

The first objective of the present invention is to provide a method and apparatus for preparing meat having less contamination and sanitation problems than physical handling. The second object of this invention is to knit or weave two or more pieces of meat together, turning them into one piece of meat. The roller grooves and pressure from rollers will mesh the muscle fibers together without the appearance of being more than one piece. This method can be used for marketing miscuts of meat or small pieces of meat into cutlets. The third object of this invention is to relocate a thicker section of meat into a thinner section of meat, insuring uniform thickness throughout. This method is accomplished by feeding the thicker end of a cutlet into the machine first. The grooves on the rollers and pressure on rollers will break down a thick section of meat and displace it into the thinner section of meat without a radical thickness reduction which results in a faster cooking time and allowing all the meat to be evenly cooked resulting in a more tender and juicy piece of meat. A fourth object of this invention is to control or change the shape of the product by folding the meat over until the proper shape is desired. The grooves on the rollers and pressure on the rollers will reduce the thickness of the folded product and mesh the muscle fibers together resulting in the prepared meat having a better plate appearance. The fifth object of this invention is to repair any holes or imperfections in the product. The product may be over-lapped where the hole or imperfection is and when run through the machine the roller grooves and roller pressure gently mesh muscle fibers together without any indication of imperfection. A sixth object of the invention is to allow bread and batter to better adhere to the product and allow a greater breading percentage on the product. The bottom set of rollers closest to the second conveyor can be replaced with a more textured roller. This roller leaves more deep grooves in the product as the product exits the machine. The seventh object is to break down muscle meat fiber causing the cutlet to become flat, unlike squeezing or stretching method. This method will allow the cutlet to stay flat while cooking. The eighth object is to make meat more tender, this being achieved when muscle fiber is broken down.

A preferred embodiment includes an apparatus and method for preparing meat such as beef, pork, lamb, goat, buffalo, venison, poultry, fish, horse, ostrich and various other meats without piercing or shredding the meat which includes a first conveyor belt for feeding the meat into the apparatus which includes a scraper at the end where meat is discharged into rollers, a feeder slide plate which helps guide the meat into the rollers insuring firm or thick pieces of meat do not extend behind the rear stack of rollers, a first row of stacked stainless steel rollers, a second row of stacked stainless steel rollers spaced from the first row of stacked rollers, and a second conveyor belt for retrieving the flattened meat. The second conveyor belt has a finisher roller that is powered by the same motor as the rollers and conveyors This roller presses the meat against the second conveyor belt reducing the thickness and removing any coarse texture in the product. The finisher roller has screw shafts with numbers allowing the finisher roller to adjust up or down to apply pressure on the product. The finisher roller has a scraper making sure that meat does not stick to the finisher roller. After the meat passes under the finisher roller the scraper on the second conveyor insures accurate discharge of product. Each roller has non-sharpened outer edges and each set of rollers has numbers to enable matching the numbers on rollers with the numbers on the frame. The rollers are supported in an aluminum or stainless steel frame and have four elongated, numbered screw shafts that each attaches a corner of the first row of stacked rollers to a corresponding corner of the second row of stacked rollers. The numbered screw shafts adjust the spacing between the first row of stacked rollers and the second row of stacked rollers to form a substantially V-cross-sectional shape. Each stack of rollers includes at least two rollers and preferably six or more rollers stacked on top of one another. Each roller has rows of generally triangular shaped raised ridges parallel to each roller axis with each triangular ridge having non-sharpened edges. The diameter of the rollers varies from top to bottom with the top rollers being of generally larger diameter than the bottom rollers. Some textured meats will require rollers to be generally smaller in diameter at the top and a larger diameter at the bottom. Likewise, the depth of the grooves between the triangular ridges varies from top to bottom with the top rollers having generally greater groove depth than the bottom rollers. The groove depth ranges generally from between $\frac{1}{4}$ inch deep to $\frac{1}{64}$ inch deep. The last set of rollers closest to the second conveyor has smooth slots cut in them allowing finger wipers to make contact on a smooth surface. This will allow meat to discharge onto the second conveyor without sticking to the bottom set of rollers. The frame includes an external cover, an external start and stop switch for activating a removable electric motor in the frame, and a bump guard bar on the cover protecting the external switch from being accidentally activated. A safety switch can activate the start/stop switch only when the cover is on the frame and when the top conveyor is installed into position.

Further objects and advantages of this invention will be apparent from the following detailed description of a presently preferred embodiment which is illustrated schematically in the accompanying drawings.

BRIEF DESCRIPTION OF THE DRAWINGS

For a fuller understanding of the nature of the present invention, reference should be had to the following detailed description, taken in connection with the accompanying drawings in which:

FIG. 2 is an exploded view of the meat preparing invention of FIG. 1 without the cover.

FIG. 2A is a close-up of the main cover.

FIG. 3A is a cross-sectional view of FIG. 2.

FIG. 3C is an exploded view of the finisher roller weight.

FIG. 4 is an enlarged view of the chain drive assemblies of FIG. 3A.

FIG. 4A is a close-up of a lubricated plastic bushing.

FIG. 5H is a cross-sectional view of the meat preparing invention of FIG. 2 along arrow YI.

FIG. 5I is a close-up of the finger wipers.

FIG. 5J is a top plan view of the roller showing right side opening while the left side stays closed.

FIG. 5L is an isolated view of various roller configurations.

FIG. 7 is a top perspective view of the top conveyor.

FIG. 7A is a close-up of a slide bolt and bushing.

FIG. 8 is a bottom perspective view of top conveyor.

FIG. 8A is a close-up of a roller drive sprocket and locking pin.

FIG. 9A is a top perspective view of top conveyor showing the belt installation.

FIG. 9B is an exploded view of top conveyor drive roller assembly.

FIG. 10A is a top perspective view of the bottom conveyor, in partial section.

FIG. 10B is an exploded view of finished roller assembly taken across line B1 of FIG. 10A.

FIG. 10C is an exploded view of the left side plate and left side slide pocket frame.

FIG. 10E is an exploded view of the bottom conveyor drive assembly of FIG. 10D.

FIG. 11A is an enlarged view of upper right roller spacing adjustment shaft knob used in meat preparing machine.

FIG. 11B is a side view of the front shaft block of FIG. 11A along arrow D.

FIG. 11C is a side view of the rear shaft block of FIG. 11A along arrow E.

FIG. 12A is an exploded view of a single roller assembly of the invention of FIG. 2.

FIG. 12B is an exploded view of the left roller shaft bearing with drive block shaft connector.

FIG. 15A is a front perspective view of the electrical control box.

FIG. 15B is an inside perspective view of the electrical control box.

FIG. 16 is a perspective view of the cradle.

FIG. 16A is a close-up of a handle fastener for the roller cradle.

FIG. 21 is an isolated view of a tenderizing, flattening and slicing roller combination.

FIG. 21A and FIG. 21B are a partial side views of the intermeshing rollers of FIG. 21.

FIG. 22 is an isolated view of a second tenderizing, flattening and slicing roller combination.

FIG. 22A is a partial perspective view of the cutter blade scraper.

FIG. 22B is a partial perspective view of the slotted roller scraper, respectively.

FIG. 25 is an end view of a flattening roller.

Like reference numerals refer to like parts throughout the several views of the drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
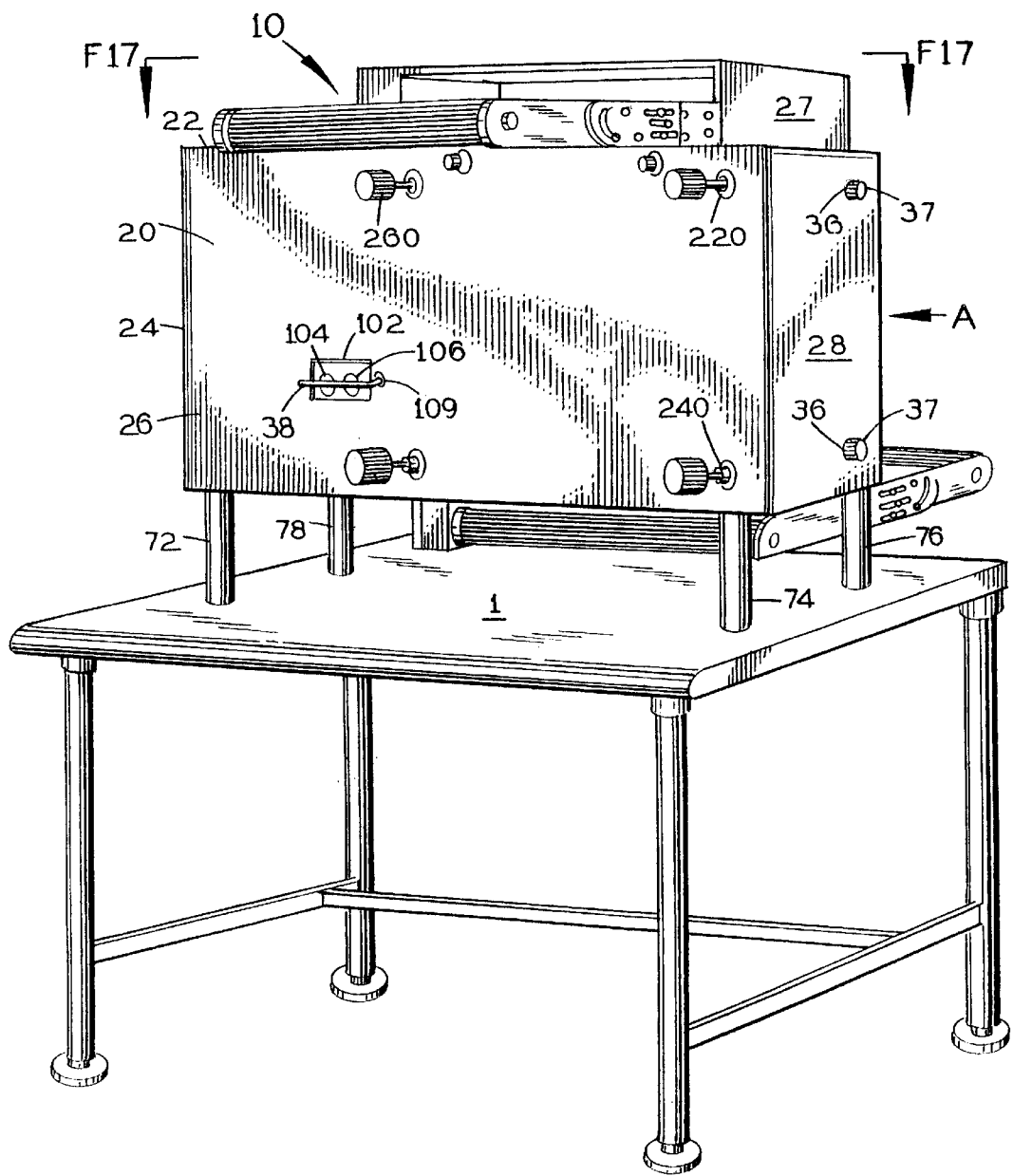
FIG. 1A is a perspective exterior view of the novel meat preparing invention.
Figure 1B:
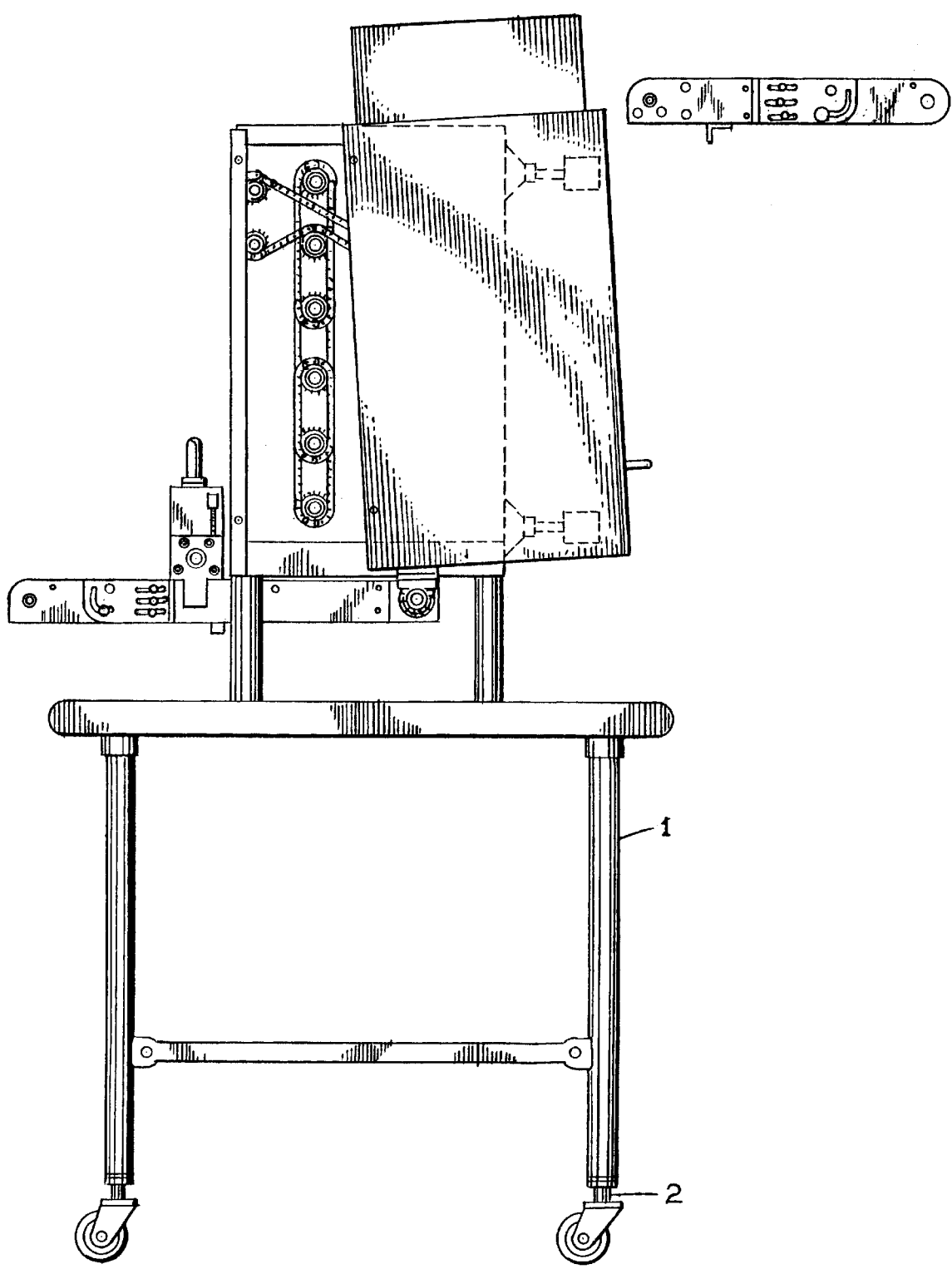
FIG. 1B is a side view of the novel meat preparing invention of FIG. 1A along arrow A.

FIG. 1A is a perspective exterior view of the novel meat preparing invention 10. FIG. 1B is a side view of the novel meat preparing invention 10 of FIG. 1A along arrow A. FIG. 2 is an exploded view of the meat preparing invention 10 of FIG. 1A without the main cover 20. Referring to FIGS. 1A, 1B and 2, invention 10 includes a cover 20 having top portion 22 with rectangular feed housing 27 and top conveyor 2700 thereon, left side 24, front side 26 and right side 28. Cover 20 is held in place through sides 24, 28 by screwable knobs 33 (not shown) and 37 that pass through side holes 32, 36 (one side shown in FIG. 1B) and into threaded holes 43, 45 of vertical flanges 42, 44 and is removed from the back cover 40 in the direction of arrow B (shown in FIG. 1B).

Vertical frame cylindrical support legs 72, 74, 76, 78 are attached at one end beneath lower rectangular support frame 50 and at their opposite end to table 1 by bolts and washers 929, 930 (shown in FIG. 3A). Lower rectangular frame 50 includes bottom left outside frame member 52, bottom front outside frame member 54, bottom right outside frame member 56 and bottom rear outside frame member 58 (FIG. 3A). Upper rectangular support frame 60 having members 62, 64, 66 and 68 are similarly attached to one another and to back cover 40 by conventional fasteners such as screws, nuts and the like. Upper rectangular support frame 60 includes top left outside frame member 62, top front outside frame member 64, top right outside frame member 66 and top rear outside frame member 68. Upper rectangular support frame 60 is attached to lower rectangular support frame 50 by left rear shaft block 82, left front shaft block 84, right rear shaft block 86 and right front rear shaft block 88. Top front outside frame member 64 is connected to top rear outside frame member 68 by top left inside frame member 92, the latter of which is attached to a top portion of left rear shaft block 82 and left front shaft block 84. Similarly, bottom front outside frame member 54 is connected to bottom rear outside frame member 58 by bottom left inside frame member 94 (more clearly shown in FIG. 3A), the latter of which is attached to a bottom portion of left rear shaft block 82 and left front shaft block 84. The twelve removable stainless steel rollers (some are shown in FIG. 2) 410, 510, 610, 710, 810, 910, 1910 are described in greater detail in reference to FIG. 5A. The top conveyor 2700 is described in FIGS. 7, 8, 9A and 9B. The bottom conveyor 2600 is described in FIG. 10A and 10D. Guide plate 23 and bracket 23' function to guide meat into the rollers from the top conveyor.

Figure 2B:
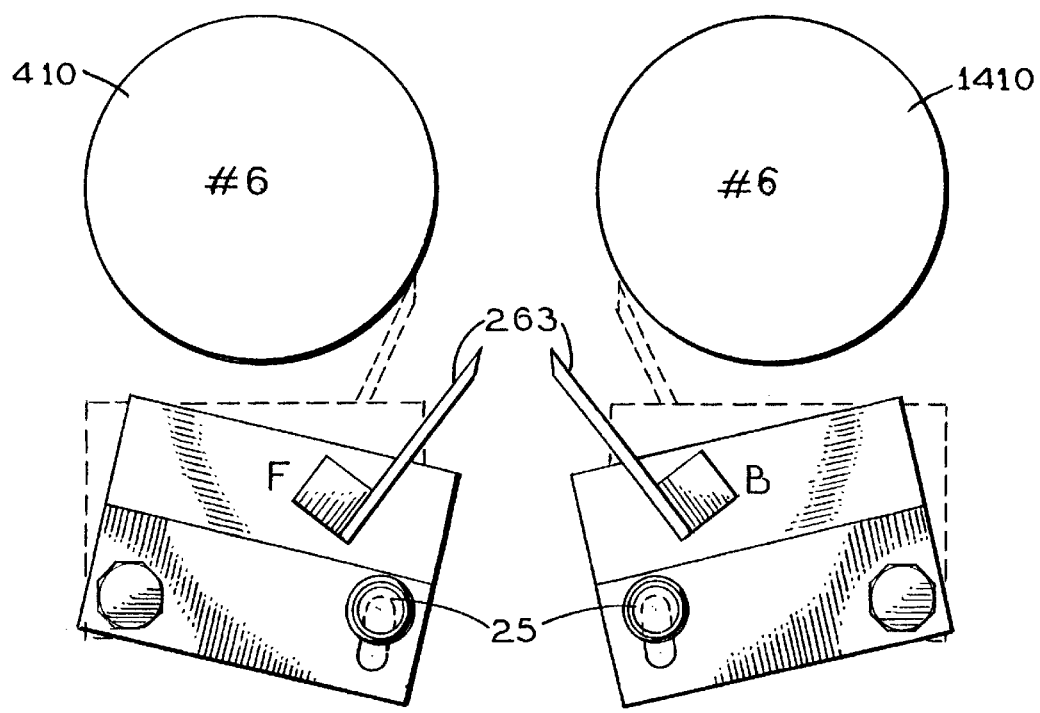
FIGS. 2B and 2C show the finger wipers in changed position relative to the rollers.
Figure 2C:
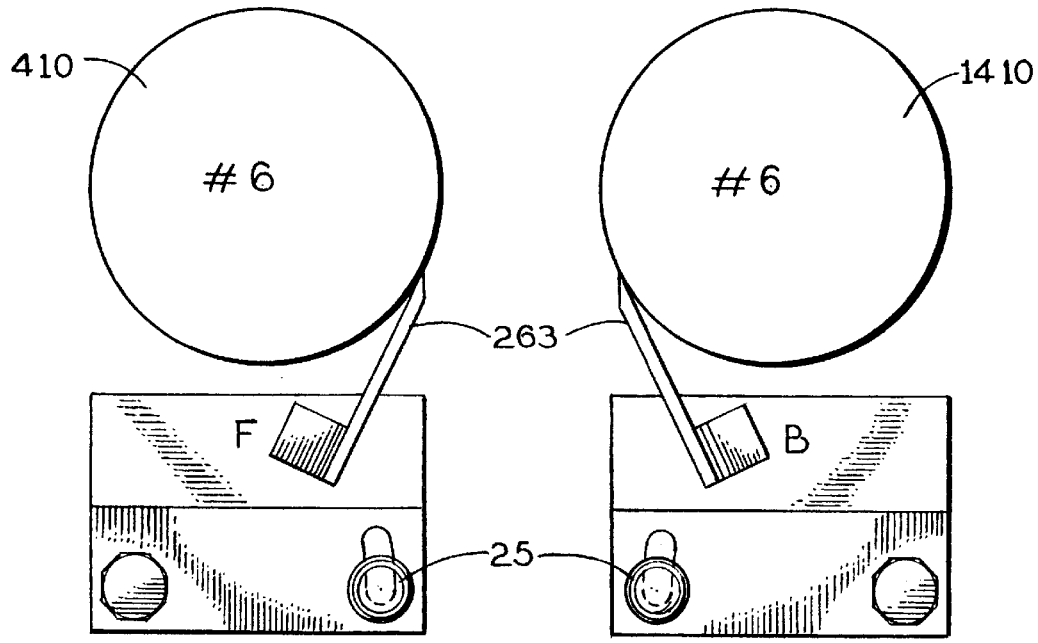

FIGS. 2B and 2C show the finger wipers 263 in changed position relative to the rollers 410 and 1410. In FIG. 2B, the finger wipers 263 are pivoted to a position away from the rollers 410 and 1410 by loosening knobs 25. In FIG. 2C, the finger wipers 263 are pivoted, by tightening knobs 25, to a position wherein the wipers 263 contact the rollers and act as scrapers. The finger wipers are also shown in FIG. 5H.

Referring to FIGS. 1A and 2, cover front portion 26 has an opening for allowing on/off switch 102 to protrude therethrough. Attached to the front cover is a U-shaped bumper guard bar 38 which prevents the START button 106 and STOP button 104 from being accidentally activated. A magnetic switch 108 is mounted in the electrical box cover 102 of the motor assembly 100 shown in FIG. 15A. A magnet 262 (FIG. 5H) mounted in the bump guard 38 makes contact with the magnetic switch 108 in the electric box 102. The machine will not operate unless cover 20 and top conveyor 2700 are mounted on the machine) Referring to FIG. 15B, electrical box 101 is mounted to electrical mounting plate 247 by screws 107.

Feeder guide plate brackets 83, 85 are attached to left rear shaft block 82 and right rear shaft block 86, respectively. Guide plate 23 extends between guide plate brackets 83, 85 and guide the meat coming off the top conveyor 2700 between the two sets of parallel rollers, thereby preventing the meat from falling behind the rollers.

Figure 13:
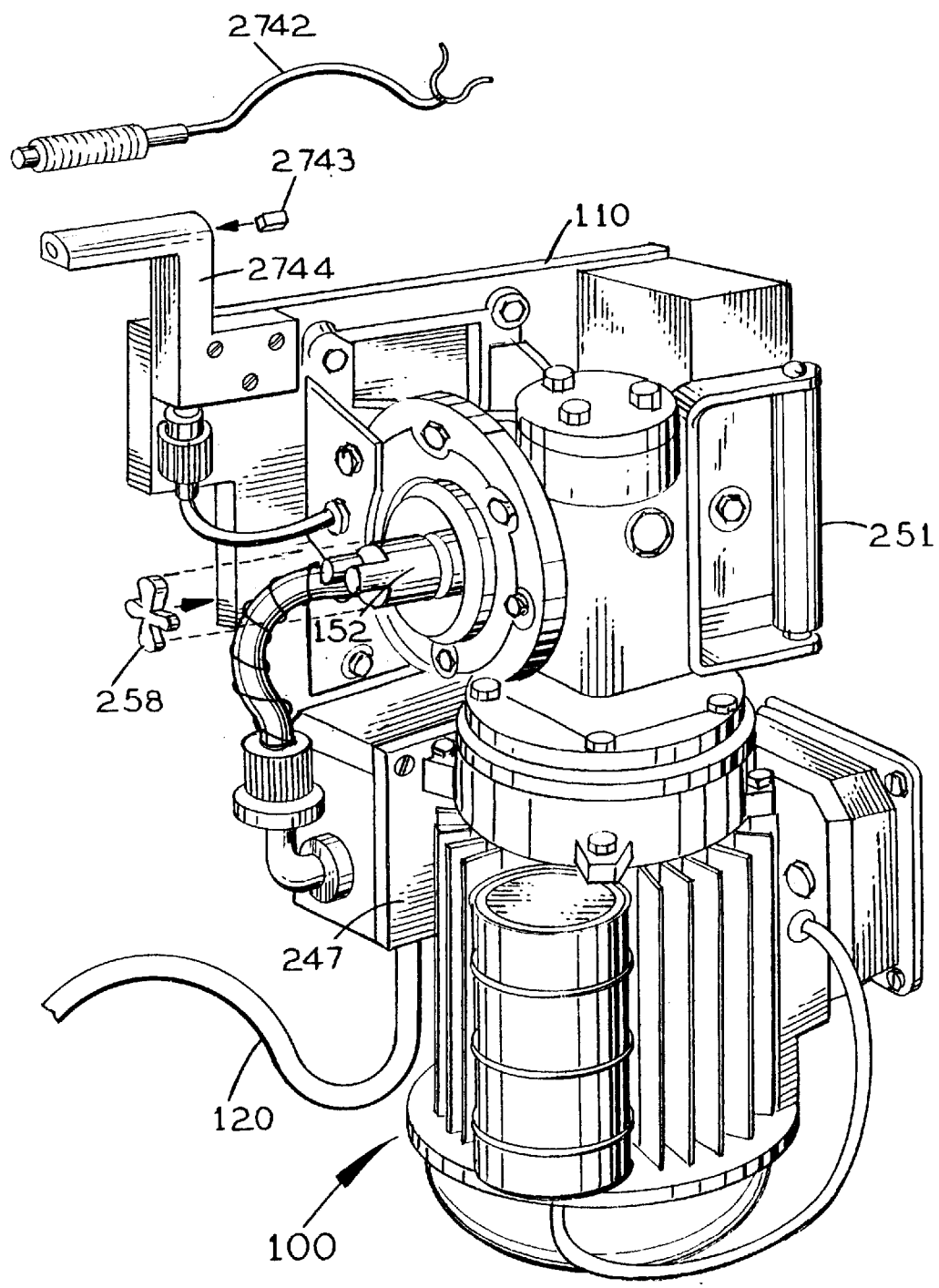
FIG. 13 is a rear perspective view of the motor.
Figure 14:
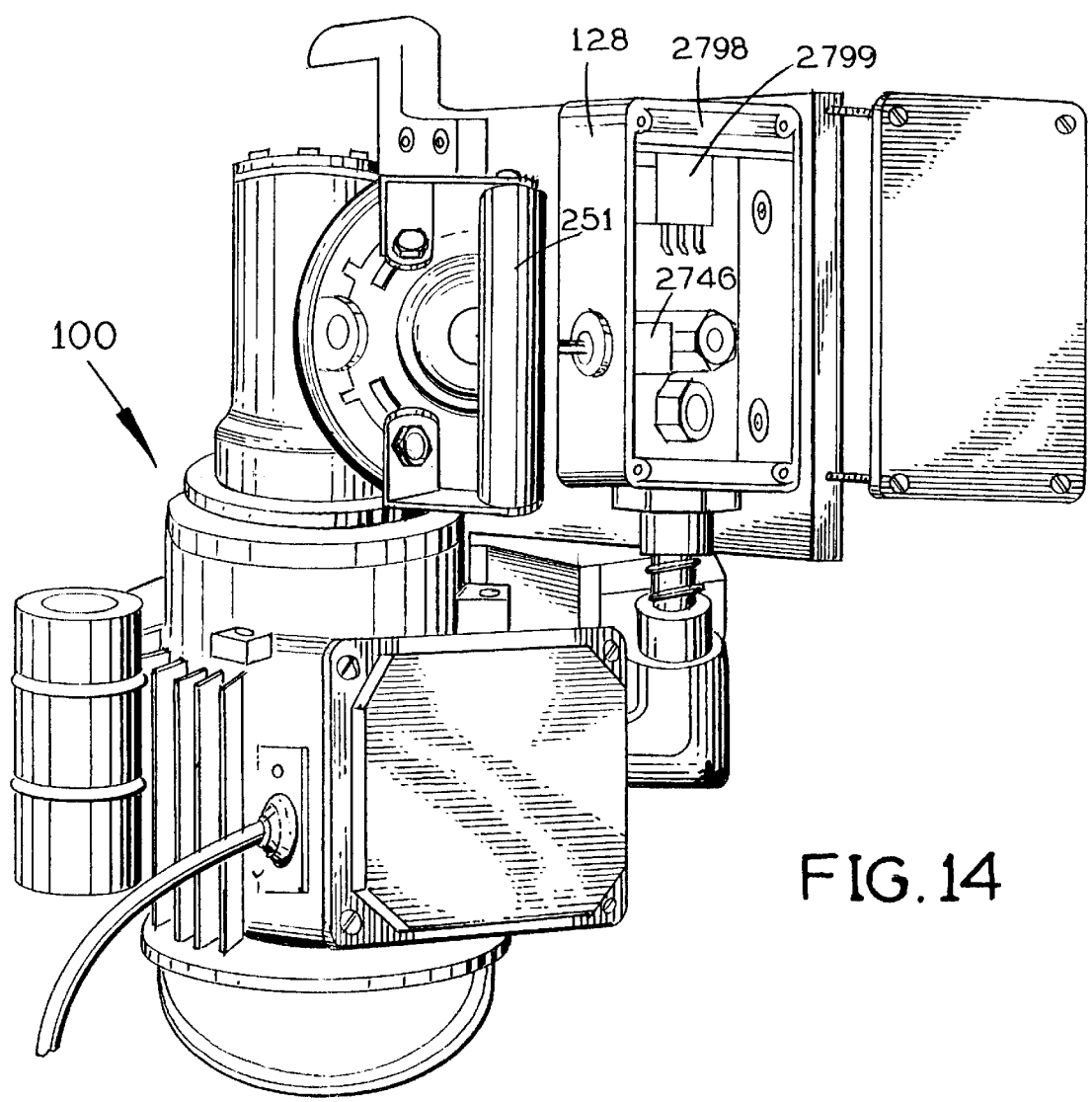
FIG. 14 is a side perspective view of the motor and electric box along line C of FIG. 13.

FIG. 13 is a side perspective view of the removable motor 100 of the meat preparing invention 10 of FIG. 2. FIG. 14 is a rear perspective view of the motor 100 of FIG. 13 along arrow C. FIG. 15A is a front perspective view of the electrical control box of the motor. FIG. 15B is an inside perspective view of the electrical control box of the motor. Referring to FIGS. 2, 13, 14, 15A and 15B, motor 100 includes a 120 or 230 Volt DC motor with a typical electrical cord 120, a bottom electrical cord grip 122, electric box 101 with START/STOP buttons 106, 104. Top electric box plate 132 is mounted to motor mounting plate 110 by screws 109. Spacer 103 causes the START/STOP buttons 106, 104 to protrude outward from the front surface of the on/off switch assembly box 102. An electric relay 2799, mounted to relay spacer 2798 within electric box assembly 128, allows both magnetic switches 108, 2742 to be activated. Motor 100 includes a motor mounting plate 110 with a female prong slot 111 and a side extended portion 112 having a female prong slot 113 for being mateable to the male prongs 211 and 213 on a motor plate 210 mounted on a spacer plate 220 to top left inside frame member 92 and left front shaft block 84. By separating female slots 111, 113 from male prongs 211, 213, the motor 100 can be removed from the rest of the meat preparing invention 10, via handle 251 in order to allow for the other components such as the frame members and rollers to be placed in a dishwasher or pressure cleaned. Motor 100 is attached to top front outside frame member 64 by screws 192, 196 passing through holes 193, 197 into threaded openings 194, 198, respectively, on the top of motor mounting plate 110. Overload switch 2746 will shut down the motor 100 if the motor 100 becomes overloaded or too hot. Hard rubber grommet 258 is used to increase the start up torque when turning on the machine. It also reduces the vibration.

FIG. 11A is an enlarged view of upper right roller spacing adjustment shaft knob 220 used in meat preparing machine 10 with rear shaft block 86 and front shaft block 88. FIG. 11B is a side view of the front shaft block 88 of FIG. 11A along arrow D. FIG. 11C is a side view of the rear shaft block 86 of FIG. 11A along arrow E. Referring to FIGS. 11A–11C, front shaft block 88 is fixably mounted by fasteners 302, such as bolts, to top right outside frame member 66. Adjustment shaft 224 is mounted in a shaft guide 223 and loosely passes through side-hole 303 of front shaft block 88, which can likewise have a threaded block 226 imbedded in a cavity therein for receiving the threaded shaft portion 225 of the adjustment shaft 224. Threaded block lid 297, secured in place by screws 298, is structured to prevent the threaded block 226 from rotating within the cavity. The adjustment 224 also includes an enlarged bulbous end 229 which is inserted into a chamber 233 in the rear shaft block 86 and secured therein by an adjustment block 235, adjustment block lid 237, and adjustment block screw 239.

Adjustment knob 220, rotatable along the direction of arrow R1, moves rear shaft 86 along the direction of arrow S1, adjusting the spacing distance between the rollers mounted in through-holes 305, 310 (to be discussed in a greater detail later). The spacing S1 between shaft blocks 86, 88 can be set by the metering numbers 0–16 on adjustment shaft 221 which slides on bushing 228 inside of adjustment shaft guide slide 222. Adjustment shaft threads 225 are mateable with threads inside the threaded block 226 in through-hole 303. Knob 299 is used to secure the adjustment shaft 224 in place, thereby preventing the settings from changing upon vibration of the meat preparing machine 10. Adjustment shaft guide slide 222, secured to shaft guide 223 by set screw 227, may be slid longitudinally through the shaft guide 223 around the end of the adjustment shaft 221 to properly calibrate the shaft. After it is calibrated, set screw 227 will secure adjustment shaft guide slide 222 in place. The numbered section of adjustment shaft 221 slides on bushing 228 inside of adjustment shaft guide slide 222.

FIG. 12A is an exploded view of a single roller assembly 900 of the invention of FIG. 2. FIG. 12B is an exploded view of the left roller shaft bearing 850 with drive block shaft connector 852, which is also shown in FIGS. 3–4. Referring to FIG. 12A, roller assembly 900 includes front shaft block 88 perpendicularly mounted to top right outside frame member 66 by fasteners 322, such as screws, and left front shaft block 84 perpendicularly mounted to top left inside frame member 92 by fasteners, such as screws (not shown). Stainless steel roller 910 has exterior grooves 912 between raised rectangular ridges that can be approximately 1/64–1/4 inches deep. The rollers will be further described in reference to FIGS. 5A–5J.

Roller 910 has a right side cylindrical opening 915 for receiving a plastic lubricated bearing 920, which receives pin portion 931 of pin shaft assembly 930. Pin portion 931 has a disc shaft base 932 with a curved oblong slot 934 for passing over a locking head screw 922 on front shaft block 88. Gripping end 936 allows a user to manipulate the pin portion 931 in the direction of arrow X1 through side opening 924 of front shaft block 88. Locking head screw 922 passes through curved slot 934. Finally, gripping end 936 and disc shaft base 932 are rotated in the direction of R2, locking the pin shaft assembly 930 and roller 910 to front shaft block 88.

Left roller drive shaft spacer 950 of roller 910 has a left side cylindrical pin socket 976 with a horizontal member 977 dividing the socket 976 down its middle. Shaft bearing 958 includes smaller side 959, which fits into side through-hole 969 of left front shaft block 84. A forked shaped end 962 of roller pin 960 inserts through shaft bearing 958 in the direction of arrow X2 and slides over horizontal member 977. The opposite end of roller pin 960 is secured to end drive sprockets 956, 954 by shaft spacer 972. Shaft spacer 972 is secured on the drive shaft 960 with bendable locking nut 974. Bendable locking nut 997 secures the shaft bearing 958 on the drive shaft 960.

Shaft bearing assembly 1000 of top conveyor 2700 includes conveyor drive shaft 1002, which is inserted through recessed spacer 1004 and plastic lubricated bearing 1006 in upper side through hole 1008 of left front shaft block 84, and secured to end drive sprocket 1056. Shaft spacer 1072 is secured on the drive shaft 1002 with bendable locking nut 1074. Conveyor chain guard 1080 secured in place by screws 1080', protects the operators fingers from the top conveyor drive chain 2500 (See FIG. 4) and conveyor drive sprocket 1056 and guides the chain 2500 on the conveyor drive sprocket 1056 during operation. Key 998 secured in place by screw 999, locks the sprocket and shaft together.

Referring to FIG. 12A and FIGS. 9A–9B, conveyor alignment rods 1007, protruding from left front shaft block 84, are inserted into conveyor alignment bushings 1107 on the side of top conveyor 2700 to secure the top conveyor 2700 in place during operation. Set screws 1010 secure the alignment rods 1007 in place. Likewise set screws 1110 secure alignment bushings 1107 in place. End paddle 1003 of conveyor drive shaft 1002 is inserted between drive pins 1102 in drive block 1104 and through bushing 1112 into conveyor drive roller 1120 causing conveyor drive roller 1120 to turn. Drive pins 1102 lock into drive pin holes 1122 in conveyor drive roller 1120 to prevent slippage during operation. Drive block screws 1105 secure drive block 1104 to conveyor drive roller 1120.

FIG. 7 is a top perspective view of the top conveyor 2700. Referring to FIGS. 7 and 9A–9B, conveyor belt 1130 may be released and removed by pivoting the small end 1150 of top conveyor 2700 upward so that slide bolt 1140 slides upward in slide notch 1142 in the direction of arrow P1. Bushing 1141 allows bolt 1140' to be tightened without pressing against the portion that slides up and down to release the conveyor belt 1130. Conveyor belt 1130 includes a v-notch strip 1160 which mates with v-notch slot 1162 on top conveyor 2700 and also mates with notch on conveyor drive roller 9000 and conveyer idler 9001 to ensure proper tracking when belt 1130 is turning. Conveyor belt 1130 extends over short plate 1166 of the small end 1150 and long plate 1164 of the large end (also shown in FIG. 5H). In operation, drive roller 1120 rotates causing belt 1130 and idler roller 1180 to move. The bottom conveyor 2600 operates similar to the top conveyor 2700.

Scraper 2710 includes scraper blade 2711 and scraper frame 2712 which insert into notches 2720 in side panels 2730 of top conveyor 2700. Scraper knobs 2714 screw through the ends of the side panels 2730 and into recesses 2732 in scraper frame 2712, thereby securing the scraper 2710 in place. In operation, scraper 2710 scrapes the meat off of the top conveyor belt 1130 and feeds it into the rollers. Safety magnet 2740 connects to magnetic switch 2742, secured within motor assembly gooseneck 2744 by set screw 2743, when top conveyor 2700 and motor 100 are installed in meat preparing apparatus 10. When top conveyor 2700 is removed from the meat preparing apparatus 10, magnetic switch 2742 disengages from safety magnet 2740, thereby shutting down or preventing the apparatus 10 from operating. The top conveyor belt 1130 may be tightened or loosened by adjusting the belt adjustment screws 2734.

FIG. 8 is a bottom perspective view of top conveyor 2700. Top conveyor 2700 is aligned with the drive system by adjusting leveling screws 2770 up or down, as necessary, and then securing leveling screws 2770 in place with set screws 2772. Conveyor support rods 2780 provide structural stability and support to the conveyor frame.

Figure 3B:
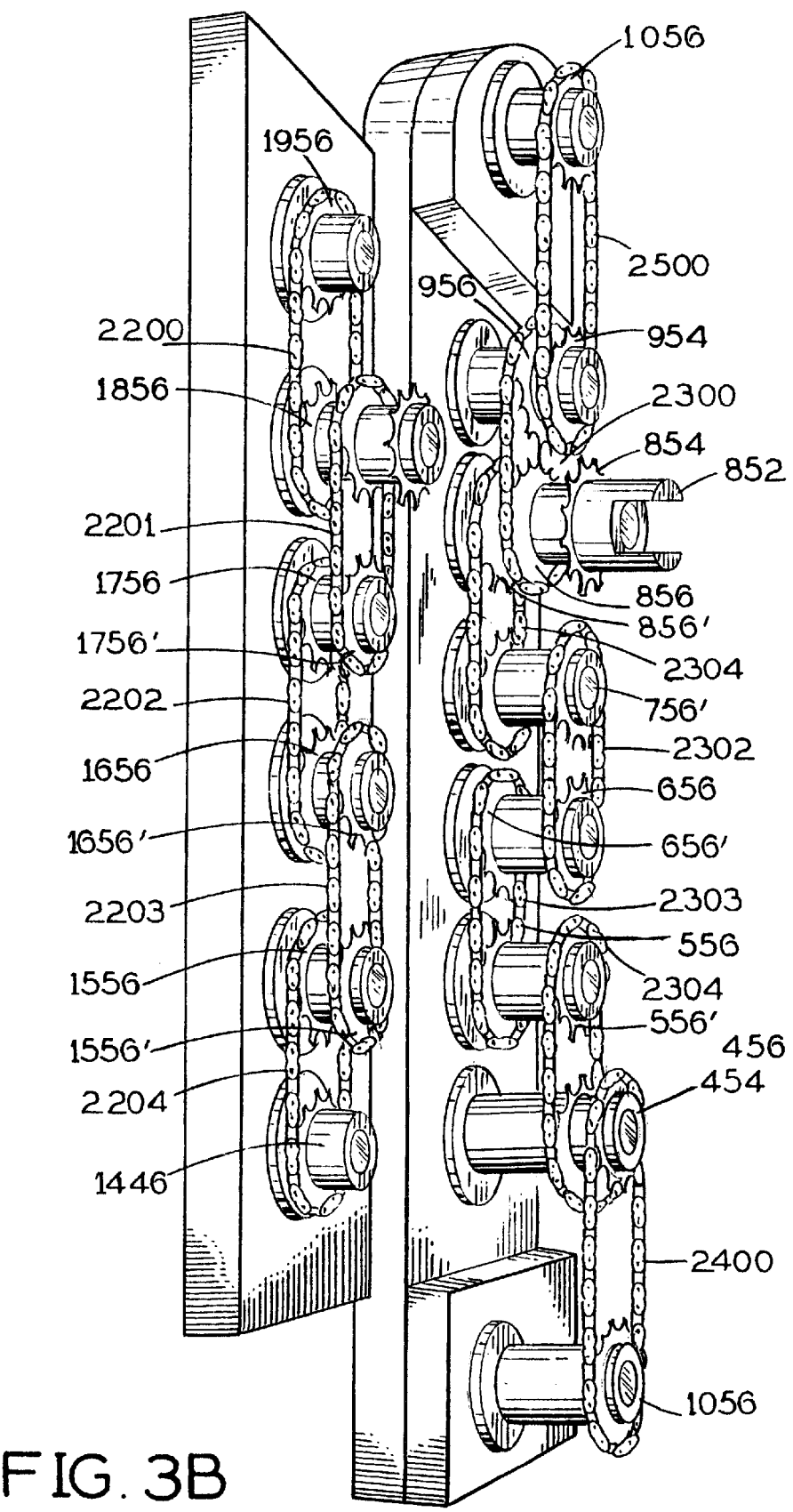
FIG. 3B is a side-perspective view of the chain drive assembly of FIG. 3A.

FIG. 3A is a cross-sectional side view of the meat preparing invention 10 of FIG. 2 along arrow Y2. FIG. 3B is a side perspective view of the chain drive assembly of FIG. 3A. FIG. 4 is an enlarged view, in partial section, of the chain drive assembly of FIG. 3A. Referring to FIGS. 3A, 3B and 4, motor drive block 152 (shown in FIG. 13) mateably connects to shaft drive block 852 causing the latter to rotate in the direction of arrow Z1. The rotating of drive sprocket 854 causes main drive chain 2100 to, in effect, rotate drive sprockets 1956 and 1856 respectively. A vertical pair of idler block sprockets 2110, 2120 and chain guide 2130 further support main drive chain 2100 in place. Idler block sprockets 2110, 2120 are mounted over lubricated plastic bushings 2111 and mounted to idler block 2400a, which pivots about pivot point 2450. Lubricated plastic bushings 2111 allow for rotation of idler block sprockets 2110, 2120 thereover. A screw with locking nut 2470 tightens against bolt 2410 inside of idler block 2400a, determining the relative position of block 2400 and, in effect, can tighten or loosen chain 2100.

The rotating of drive sprocket 854 causes adjacent drive sprockets 856 and 856' and first chains 2300 and 2301 to rotate and, correspondingly, effect the rotation of drive sprockets 956, 756, 756', 656, 656' 556, 556' and 456 via chains 2302, 2303 and 2304. Likewise, the rotating of drive sprockets 1856 and 1956 causes second chain 2200 to rotate and effect the rotation of drive sprockets 1756, 1756', 1656, 1656', 1556, 1446' via chains 2201, 2202, 2203 and 2204. The rotating of these drive sprockets directly cause their respective attached rollers to rotate. The rotating of drive sprocket 956 also causes attached drive sprocket 954 and top conveyor drive chain 2500 to rotate, thereby causing top conveyor drive sprocket 1056 and conveyor drive roller 1120 to rotate. Likewise, the rotating of drive sprocket 456 causes attached drive sprocket 454 and bottom conveyor drive chain 2400 to rotate, thereby causing bottom conveyor drive sprocket 1056 and conveyor drive roller 1220 to rotate. Top conveyor knobs 1108 insert through mounting brackets 2724, 2725, which are secured to top conveyor 2700 by screws 2726, to hold top conveyor 2700 in place on top surface 22 (mounting brackets 2724, 2725 shown in FIGS. 7–8).

Figure 6:
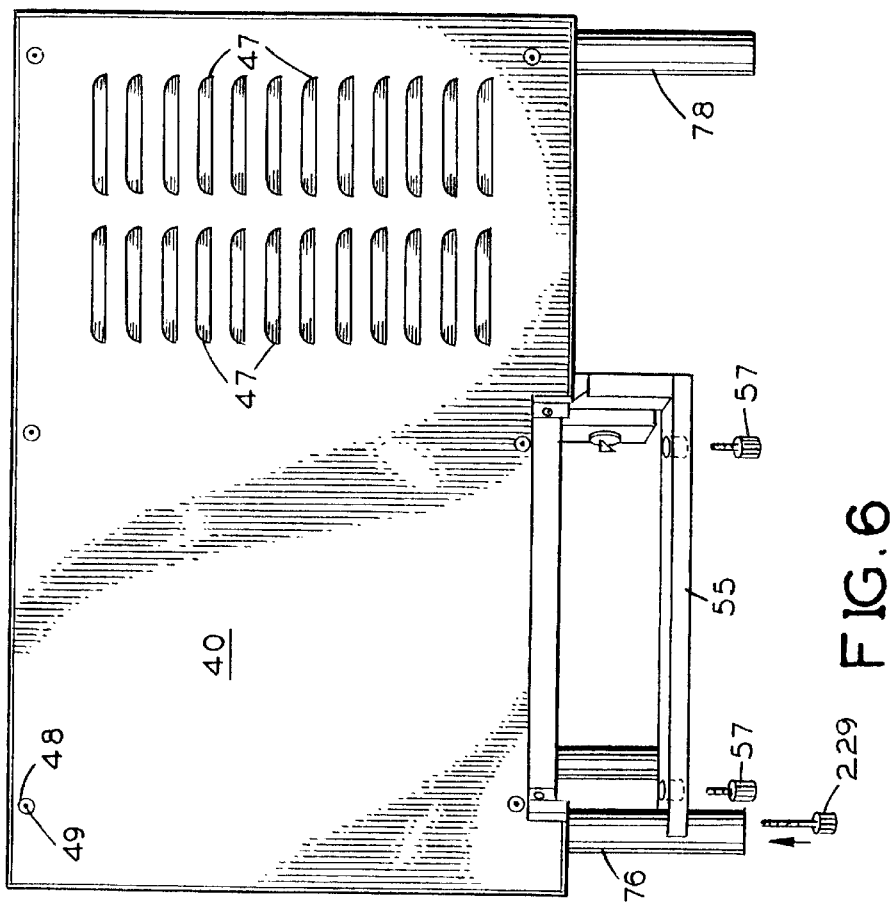
FIG. 6 is a rear view of the meat preparing device showing the rear cover.

FIG. 6 is a rear view of the meat preparing device showing the back cover 40, attached to the back of the top frame 60 and the back of the bottom frame 50 by bolts 48 and washers 49, and the bottom conveyor mounting frame 55. The bottom conveyor 2600 is secured to the mounting frame 55 by the mounting knobs 57. A plurality of cooling vents 47 are provided in the back cover 40 to allow heat generated by the motor 100 to escape and outside ambient air to enter and circulate around the motor 100, thereby maintaining the motor 100 at a safe operating temperature.

FIG. 10A is a top perspective view of the bottom conveyor 2600. FIG. 10B is an exploded view of finished roller assembly 2650 taken across line B1 of FIG. 10A. FIG. 10C is an exploded view of left side plate 2654 and finished roller drive assembly 2651. Referring to FIGS. 10A, 10B and 10C, finished roller 2660, wiper frame 2653 with attached wiper 2652, bearings 2661, 2663 and bearing shaft 2680 are mounted longitudinally between and secured to right side plate 2654 and left side plate 2655 by bracket 2683 and mounting knobs 2681, 2682. Alignment pins 2684 and alignment holes 2685 and recessed scraper pocket 2653' are provided to ensure proper alignment and installation of the finished roller assembly 2650. Wiper frame 2653 is secured to right side and left side plates 2654, 2655 by knobs 2662, 2663. Finished roller adjustment knobs 2670, 2672 allow a user to manipulate the externally threaded finished roller adjustment shafts 2674, 2676 to raise or lower the height of the finished roller 2660 off of the bottom conveyor belt. Screw 2696 maintains finished roller adjustment shafts 2674, 2676 in place, thereby preventing setting changes caused by vibration of machine 10. Finished roller adjustment shafts 2674, 2676 mate with internally threaded blocks 2675, 2677, which are secured to right side 2654 and left side plates 2655, respectively, by screws 2781. Plastic cap 2698 allows finished roller adjustment shafts 2674, 2676 to turn freely without scratching conveyor 2601. Right side and left side plates 2654, 2655 are seated in right side and left side slide pockets 2656, 2657 of right side and left side slide pocket frames 2658, 2659, respectively. Slide plates 2692, 2693 are secured to left side slide pocket 2659 by screws 2694 to prevent the bottom conveyor drive assembly 2651 from binding during adjustments. Bottom conveyor scraper frame 2686 and attached scraper blade 2687 are secured to the bottom conveyor 2600 by scraper knobs 2688, which screw into the slots 2690 in bottom conveyor flanges 2689 and into recesses 2691 in scraper frame 2686. Scraper blade 2687 prevents the flattened meat from sticking to the bottom conveyor belt 2601. Safety guard 2695 prevents fingers from getting caught in chain 2760 and its associated sprockets. Rigid rub pads 3310 are mounted beneath the conveyor belt 2601 directly below the finisher roller 2660 and is structured to prevent premature wearing of the conveyor belt 2601 and bottom conveyor system 2600. Rub pads 3310 are preferably constructed of stainless steel or some other hardened, substantially smooth material.

Figure 10D:
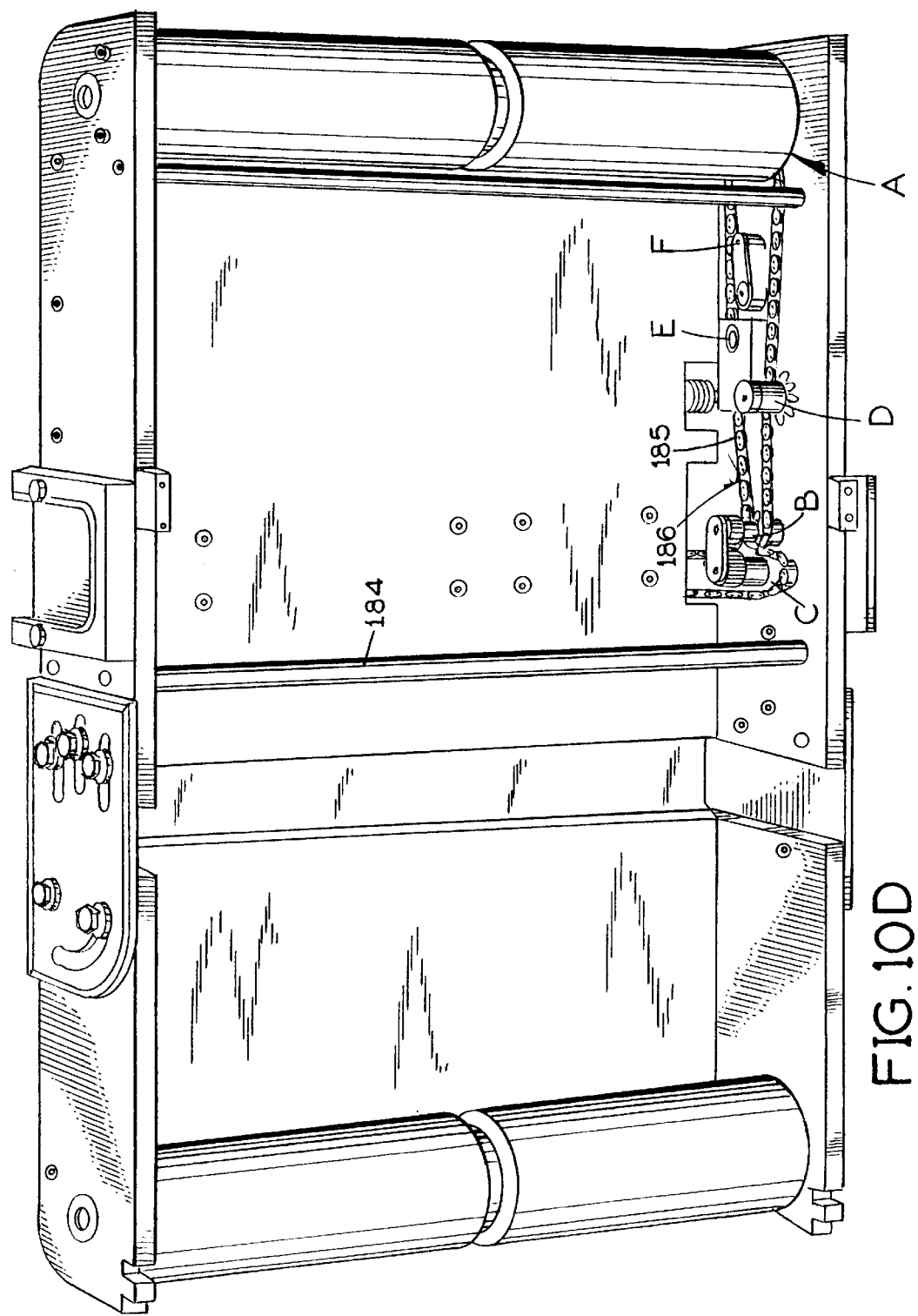
FIG. 10D is a bottom perspective view of the bottom conveyor showing the bottom conveyor drive assembly.

FIG. 10D is a bottom perspective view of the bottom conveyor 2600 showing the finished roller drive assembly 2651. FIG. 10E is an exploded view of the several views of the finished roller drive assembly 2651 of FIG. 10D. Referring to FIGS. 3A, 10C, 10D and 10E, the finished roller drive assembly 2651 includes first idler sprocket 2804, drive sprocket 2806, drive gear 2811, second idler sprocket 2814 and idler gear 2815. Idler sprocket 2804 rotates about the longitudinal axis of stripper bolt 2807 and is mounted to the inside face of bottom conveyor sidewall 2899 by stripper bolt 2807 and washer 2808. Drive gear 2811 and drive sprocket 2806 interlock into each other causing both drive gear and drive sprocket to rotate together. Lubricated bushings 2807', 2813' and 2810' allow sprockets 2804, 2814 and 2806 and gears 2815 and 2811 to rotate freely. Drive gear 2811 and idler gear 2815 are disposed in interlocking relation with one another so that rotation of drive gear 2811 causes a corresponding rotation of idler gear 2815. Connecting plate 2816 maintains the proper positioning of drive shaft 2810 relative to idler shaft 2813 and prevents drive gear 2811 and idler gear 2815 from disengaging from one another. Drive sprocket 2806 and drive gear 2811 rotate about fixed drive shaft 2810 and are secured in place by bendable locking nut 2812. Likewise, idler sprocket 2814 and idler gear 2815 rotate about fixed idler shaft 2813 and are secured in place by bendable locking nut 2817. Additionally, idler sprocket 2814 and idler gear 2815 are secured to one another by pins 2818. A T-shaped chain guide 2850 is positioned between the bottom conveyor large drive chain 2803 and mounted to the inside face of bottom conveyor sidewall 2899 by bolt 2851' so as to guide the bottom conveyor secondary drive chain 2803 onto the idler sprocket 2804. The rotating of bottom conveyor drive roller 1220 causes a corresponding rotation of bottom conveyor drive pulley shaft 2801, sprocket 2802, bottom conveyor secondary drive chain 2803, first idler sprocket 2804, drive sprocket 2806 and drive gear 2811 and second idler sprocket 2814 and idler gear 2815. A notched portion 2801' in sprocket 2802 mates with a correspondingly shaped notched portion (not shown) in drive pulley shaft 2801 to secure sprocket 2802 to drive pulley shaft 2801 so that they rotate together. Pins 2802' pass through notched portion 2801' to lock sprocket 2802 and drive pulley shaft 2801 to bottom conveyor drive pulley. Drive chain guide 2854, secured by screws 2854', acts to guide the bottom conveyor large drive chain 2803 onto the drive sprocket and prevent skipping. The slack in the bottom conveyor large drive chain 2803 is adjusted by pivoting the generally rectangular shaped chain adjusting block 2852 about screw 2853. Bump stop 2851 prevents the bottom conveyor 2600 from being inserted too far into the meat preparing machine 10.

Finished roller drive sprocket 2770 is secured to finished roller drive sprocket shaft 2771 by inserting locking pin 2772 (FIG. 10C) into holes 2773 and 2774, respectively. The drive sprocket shaft 2771, in turn, is secured to left side plate 2655 by drive sprocket plastic lubricated bushing 2775, washer 2776 and screw 2777. Rotating of idler gear 2815 causes finished roller drive chain 2760, finished roller drive sprocket and, correspondingly, finished roller 2660 to rotate.

FIG. 12B is an exploded view of a single roller assembly having drive block shaft end 852 which mates to the drive block motor mount 152 shown in FIG. 13. Drive block 852, drive sprocket 856, 856' and 854 and shaft spacer 872 are installed onto drive shaft 860 with forked shaped end 862. These components are installed and operate similar to the like components in left roller shaft bearing assembly 950. The operation of drive block shaft end 852 is described in greater detail in reference to FIGS. 3–4.

FIG. 3C is an exploded view of the finisher roller weight 3210. Handle 3220 is secured to the finisher roller weight 3210 by brackets 3230 and bolts 3240. The finisher roller weight 3210 is structured and disposed to apply pressure to the finisher roller 2660, thereby insuring maximum thickness reduction and a smooth texture of the meat. Guide pins 3250, secured to finisher roller 2660 by set screws 3260, insure proper placement of the finisher roller weight 3210 on the upper surface of finisher roller 2660 and prevent movement during operation.

FIG. 5H is a cross-sectional view of the meat preparing invention of FIG. 2 along arrow Y1. Lip edge 21 on the rear of the top cover portion 22 can snap in place behind a longitudinal groove 69 in top rear outside frame member 68 (shown more clearly in FIG. 2). Upper left roller spacing adjustment shaft knob 260 with threaded shaft with numbers 261 and lower right roller spacing adjustment knob 280 with threaded shaft 281 move left rear shaft block 82 in the direction of arrow S1 up to position 82'. Upper right roller spacing adjustment shaft knob 220, lower right roller spacing adjustment knob 240, upper left roller spacing adjustment shaft knob 260 and lower left roller spacing adjustment shaft knob 280 can be manipulated to form an overall spacing S6 between the two vertical rows of rollers having a V-cross-sectional shape in order to optimize the meat preparing action therebetween. Cover magnet 262 activates the switch on the motor 100. The motor 100 will only operate when magnet 262 is in contact with the switch.

Figures 5A, 5B:
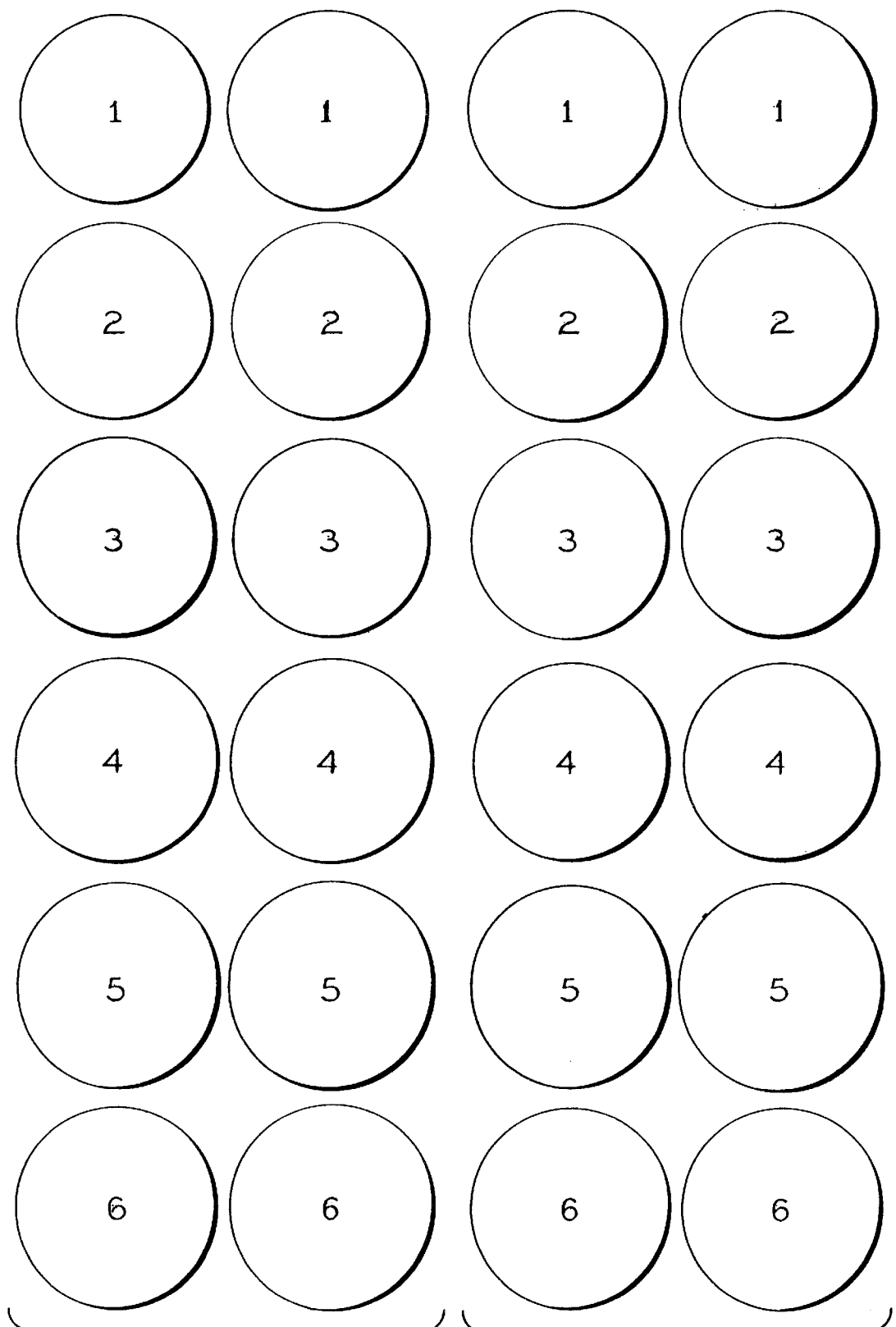
FIG. 5A is an isolated view of a roller combination.
FIG. 5B is an isolated view of a roller combination.
Figures 5C, 5D:
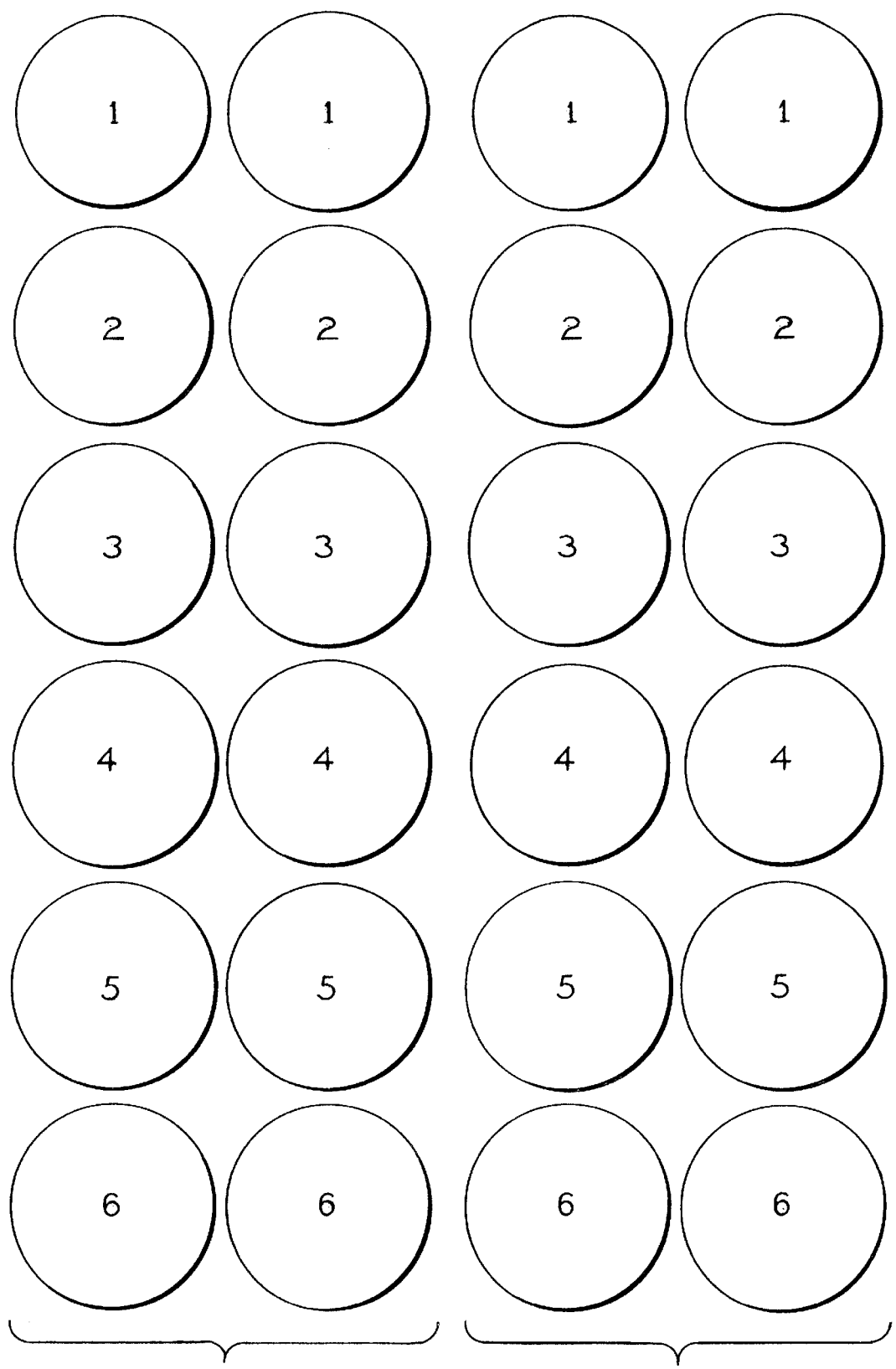
FIG. 5C is an isolated view of a roller combination.
FIG. 5D is an isolated view of a roller combination.
Figures 5E, 5F:
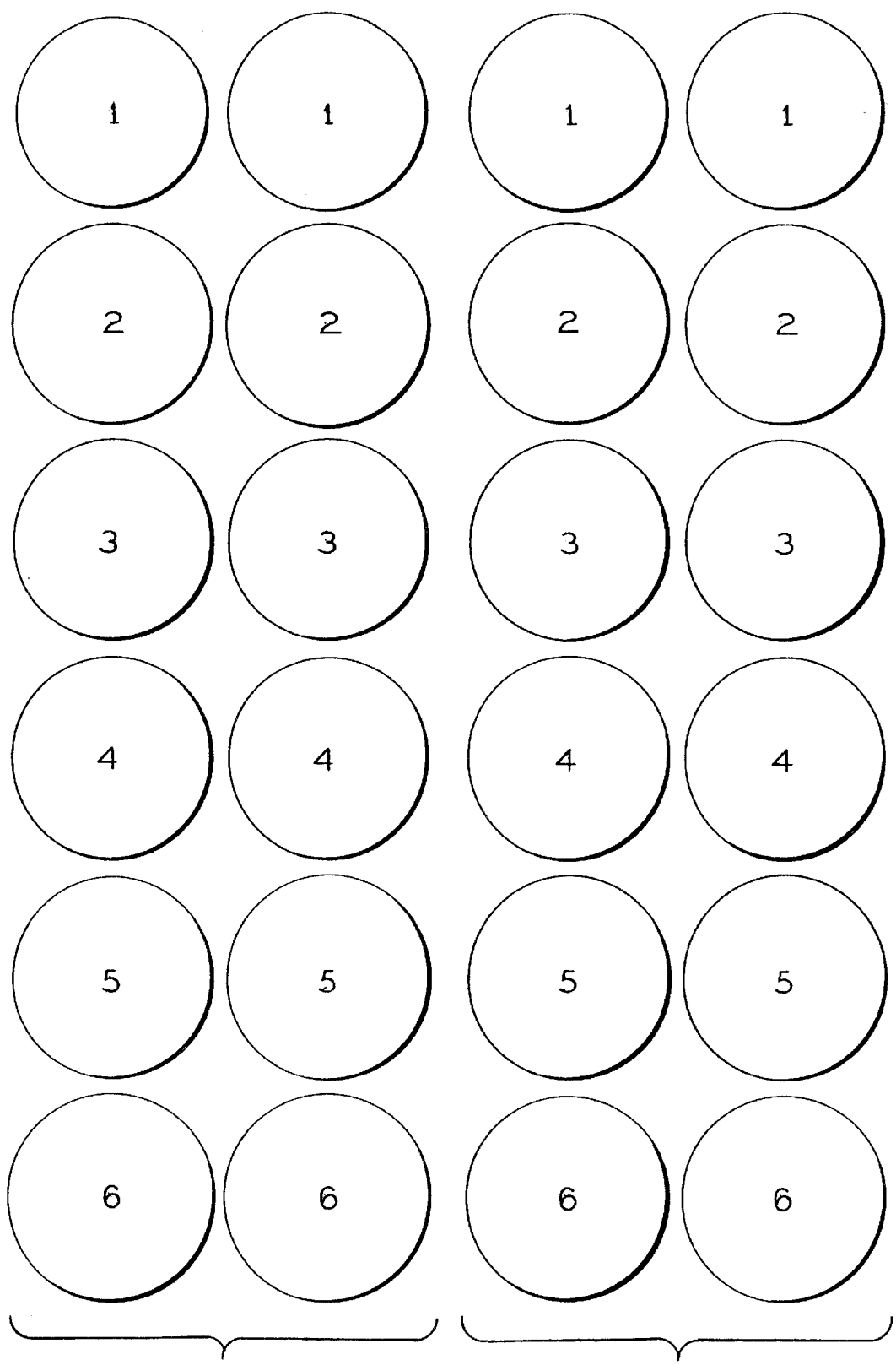
FIG. 5E is an isolated view of a roller combination.
FIG. 5F is an isolated view of a roller combination.

FIG. 5J is a top view of the rollers of FIG. 2 showing the movement of the rollers and the various spacing that can be achieved therebetween to accommodate different meats of differing thicknesses (roller configurations and spacing are further discussed in FIGS. 5A–G). The specific configuration in FIG. 5J shows the right side rollers in the open position and the left side rollers in the closed position and may be used to control the shape of the meat by spreading the meat from the left side into the right side. Similarly, the rollers may be configured with the left side rollers in the open position and the right side rollers in the closed position.

Figure 17:
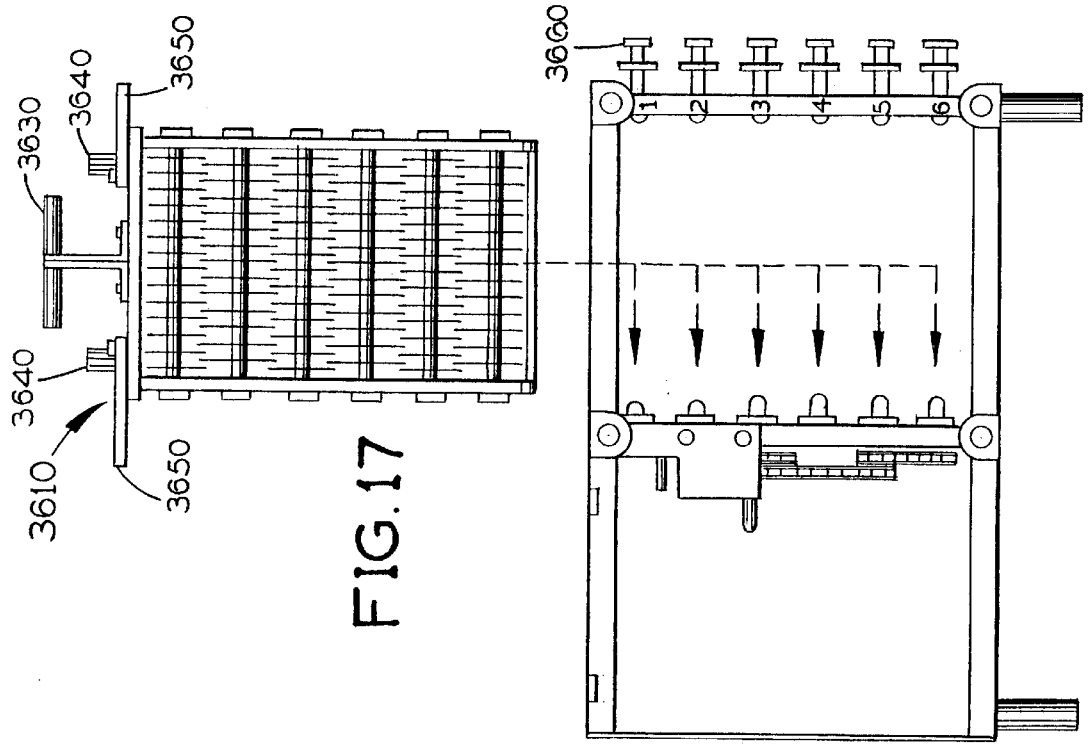
FIG. 17 is a cross sectional view of the apparatus, taken across the line F17—F17 of FIG. 1A, showing the insertion of the cradle into the meat preparing apparatus.

Due to the intermeshing relationship of the adjacent rollers comprising the various different roller combinations (the different roller combinations are discussed further below), it may be necessary to install, and remove, all of the rollers simultaneously, Referring now to FIGS. 16–17, a roller cradle 3610 is utilized to accomplish such simultaneous insertion and removal of the rollers. The roller cradle 3610 includes a number of pockets 3620 equal to the number of rollers to be utilized in the particular machine 10. In use, the rollers constituting the desired functional combination are inserted into the pockets 3620 in the proper order and configuration. Using handle 3630, the roller cradle 3610 is inserted into the machine 10 from the top. Slide plates 3650 are utilized to support the roller cradle 3610 on the machine and knobs 3640 are utilized to lower the roller cradle 3610 into the machine 10 and release the rollers from the pockets 3620. The rollers are then locked in place and secured to the corresponding drive shaft by pins 3660. After the rollers have been released from the pockets 3620, the roller cradle 3610 may be removed from the top of the machine 10

Figure 18A:
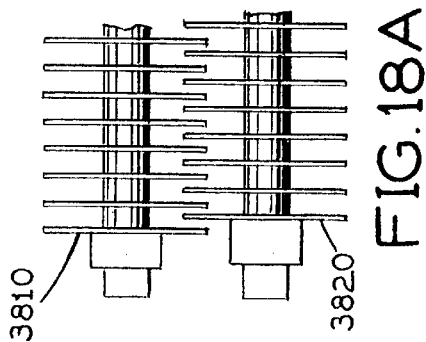
FIG. 18A is a partial side view of two meshing interweaving rollers.
Figure 18B:
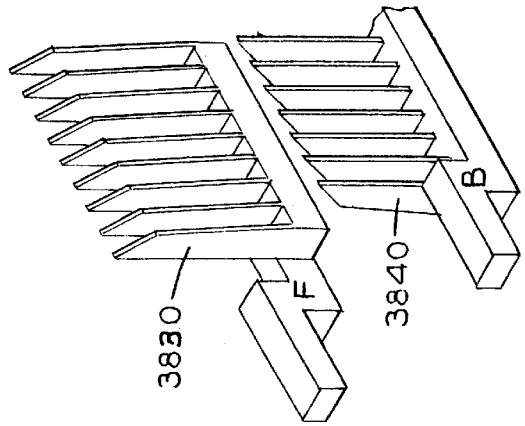
FIG. 18B is a partial perspective view of front and back tenderizing scrapers.
Figure 18:
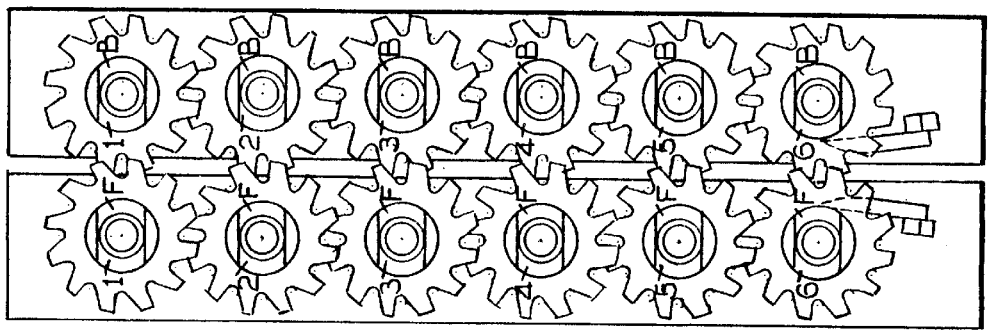
FIG. 18 is an isolated view of the tenderizer roller combination.

FIGS. 18–23 illustrate different roller combinations that may be used depending upon the type of meat being prepared, its temperature, texture, moisture and size and whether it is to be flattened, tenderized, pierced, cut into strips or combined with another piece of meat. FIG. 18 illustrates a particular roller combination structured to tenderize meat in one pass, as opposed to conventional tenderizer rollers that require five or more passes to properly tenderize the meat. This configuration is also useful for knitting/weaving two or more pieces of meat together to form one piece, changing the configuration of the meat or repairing damaged meat. The interweaving relationship of the rollers 3810, 3820 enables the meat to be scraped out of the rollers by the roller immediately beneath it. Front and back tenderizer scrapers 3830, 3840 guide the meat out of the machine without getting caught in the rollers.

Figure 19A:
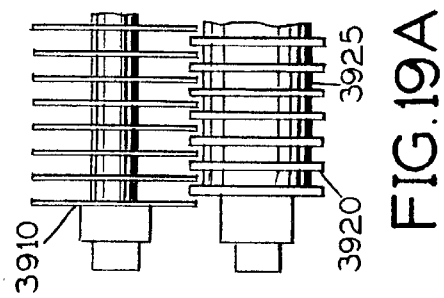
FIG. 19A is a partial side view of two intermeshing rollers of FIG. 19.
Figure 19:
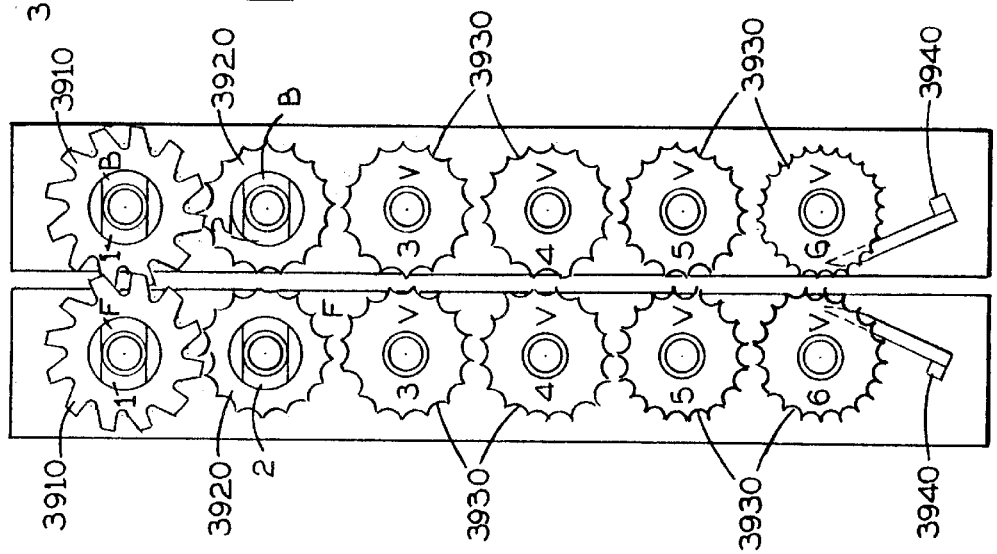
FIG. 19 is an isolated view of the tenderizing and flattening roller combination.
Figures 20, 23:
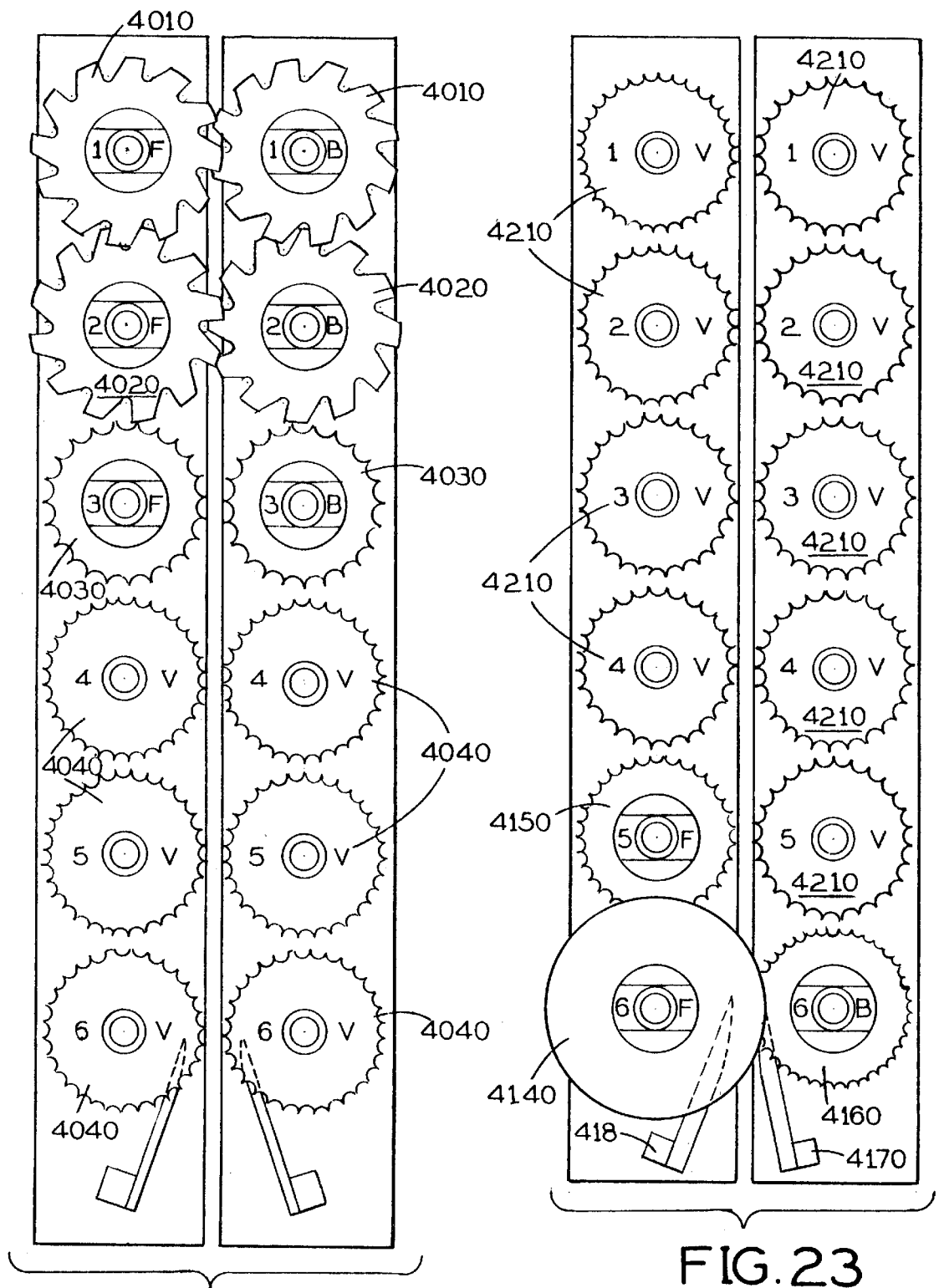
FIG. 20 is an isolated view of a second tenderizing and flattening roller combination.
FIG. 23 is an isolated view of a flattening and slicing roller combination.

FIG. 19 illustrates a particular roller combination structured to tenderize and then flatten the meat. This configuration is also useful for knitting/weaving two or more pieces of meat together to form one piece, changing the configuration of the meat or repairing damaged meat. In this configuration, the top rollers 3910 include deep grooves for tenderizing. The next lower rollers 3920 include much smaller slots 3925 and are structured to scrape the meat from the tenderizer rollers 3910 as the blades from the tenderizer rollers 3910 pass through the slots 3925 of the scraper rollers 3920. The remaining four rollers 3930 are structured to flatten the meat. A scraper 3940 is provided at the bottom to remove the meat from the bottom roller. The configuration shown in FIG. 20 is similar to that shown in FIG. 19 except that the top two rollers 4010, 4020 include deep grooves structured to tenderize the meat. The next lower rollers 4030 are then structured to scrape the meat from the tenderizer rollers immediately above them and the remaining rollers 4040 are structured to flatten the meat.

FIGS. 21 and 22 illustrate roller configurations structured to tenderize, flatten and cut meat into strips. These configurations include either one (FIG. 21) or two (FIG. 22) tenderizing rollers 4110 at the top, a scraper roller 4120 immediately beneath the bottom tenderizing roller 4110 and one or two rows or preparing rollers 4130 beneath the scraper rollers 4120. A cutter blade roller 4140 is positioned in the bottom front roller position and is structured to cut the meat into strips. A cutter blade clearance roller 4150 is structured and disposed to mate with the cutter blade roller 4140 from above and a cutter blade slotted roller 4160 is structured and disposed to mate with the cutter blade roller 4140 from the same row and the slotted roller scraper 4170 below. A cutter blade scraper 4180 is positioned below the cutter blade roller 4140 and is structured to scrape the meat off the cutter blade roller 4140.

FIG. 23 illustrates yet another roller configuration. This configuration is structured to flatten the meat and then cut the meat into strips. It is also useful for knitting/weaving two or more pieces of meat together to form one piece, changing the configuration of the meat or repairing damaged meat. In this configuration, the top four rows of rollers 4210 are structured to flatten the meat. The bottom two rows of rollers include the cutter blade roller 4140, cutter blade clearance roller 4150 and cutter blade slotted roller 4160 described in relation to FIGS. 21 and 22 above. The slotted roller scraper 4170 and cutter blade scraper 4180 described above are also provided to scrape the meat off the cutter blade roller 4140.

It must be appreciated that various different roller combinations can be utilized to prepare the meat in the desired manner. FIGS. 5A–5G illustrate a few of the possible alternative roller combinations.

Figures 24A, 24B:
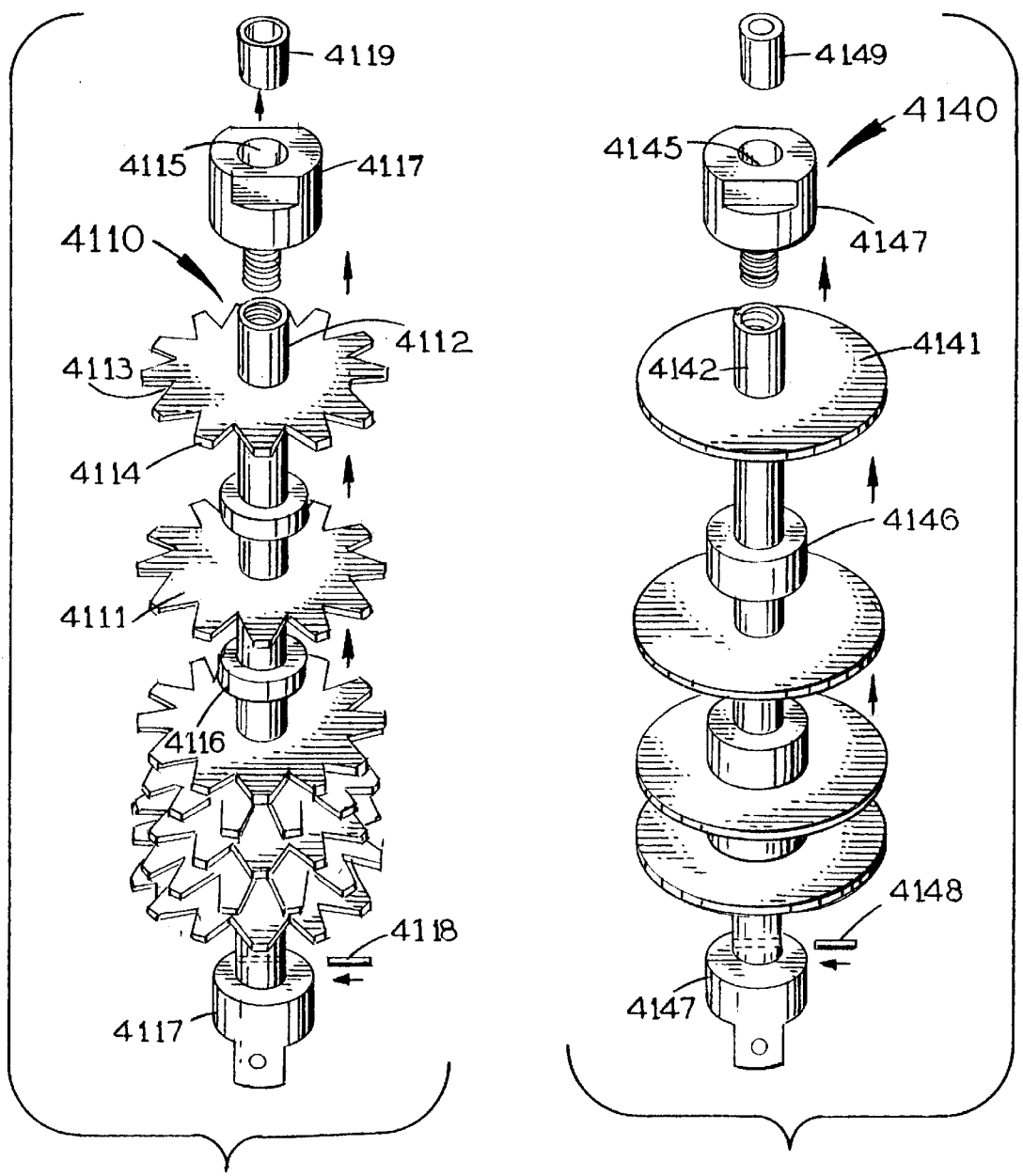
FIG. 24A is an exploded view of a tenderizing roller.
FIG. 24B is an exploded view of a slicing roller.

FIGS. 24A and 24B present exploded views of a tenderizer roller 4110 and cutter blade roller 4140, respectively. The tenderizer roller 4110 includes a shaft 4112, a plurality of blades 4111, each having a plurality of generally flat topped teeth 4114 with v-shaped grooves 4113 therebetween, a spacer 4116 between each blade 4111 and an externally threaded locking cap 4117 on each end of shaft 4112 to secure the blades 4111 and spacers 4116 thereon. Locking pin 4118 is used to lock locking cap 4117 onto the shaft 4112 on the drive side of the roller 4110. A bushing 4119 is inserted into a recessed cavity 4115 in the end of the locking cap 4117 on the non-drive side of the roller 4110 to enable the roller 4110 to freely rotate.

Like the tenderizer roller 4110, the cutter blade roller 4140 also includes a shaft 4142, a spacer 4146 between each blade 4141 and an externally threaded locking cap 4147 having a locking pin 4148 on the drive side of the roller 4140 and a bushing 4149 on the non-drive side of the roller 4140. The strip cutting blade 4141 on the cutter blade roller 4140 is circular with sharpened cutting edges.

Figures 5G, 5K:
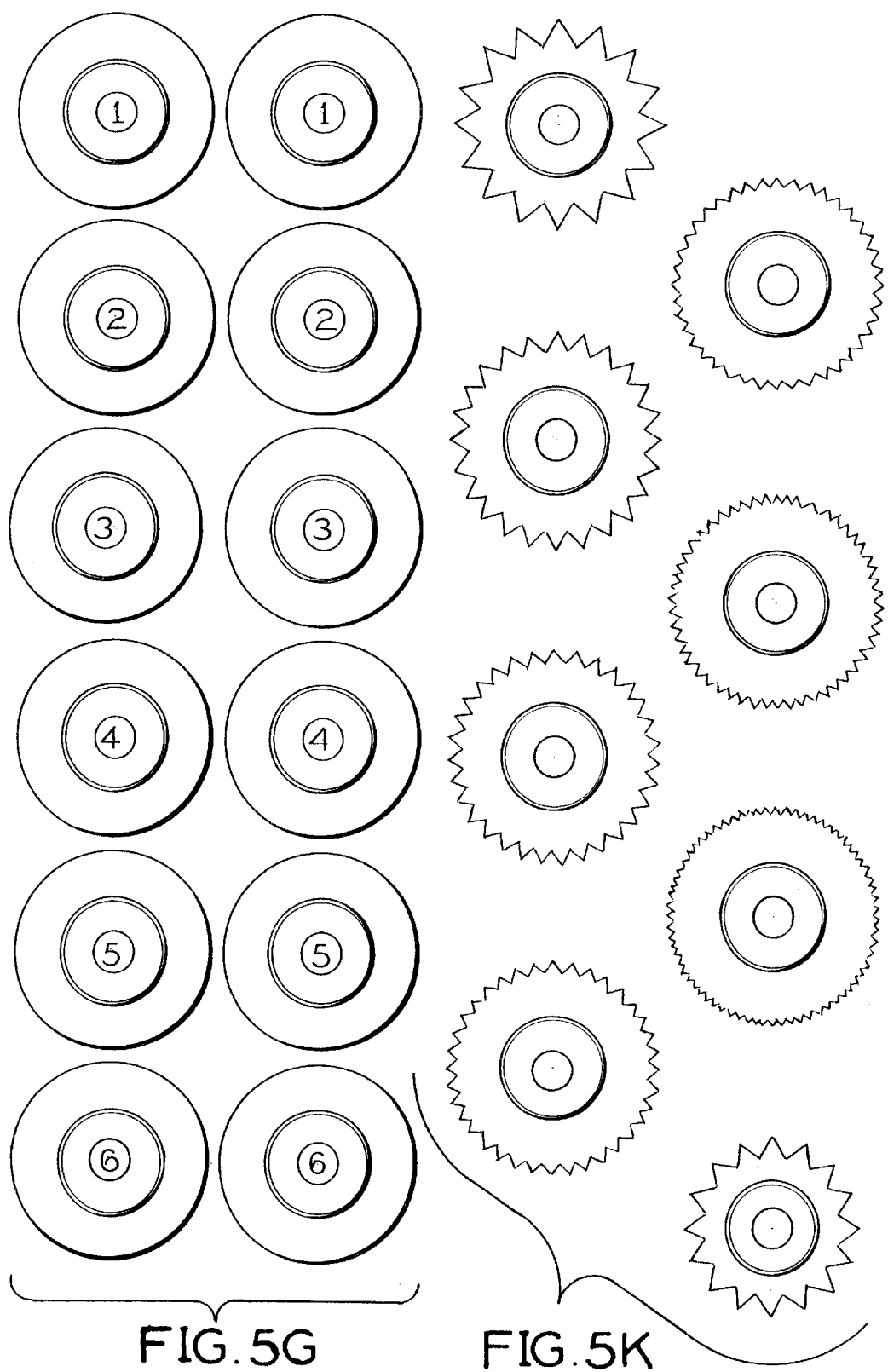
FIG. 5G is an isolated view of a roller combination.
FIG. 5K is an isolated view of various roller configurations.

FIG. 25 illustrates the preferred flattening roller configuration. In this configuration, the roller includes a plurality of generally c-shaped grooves 4510. FIGS. 5J–5K illustrate alternative flattening roller configurations comprising a plurality of non-sharpened, triangular shaped teeth.

The basic frame members can be formed from aluminum while the remaining components, such as the rollers, blades and fasteners can be stainless steel and the like.

The preferred embodiment describes the invention as preparing meat. For the purposes of this invention, meat includes beef, poultry, veal, pork, lamb, goat, buffalo, venison and fish filets, horse, ostrich, and various other meats.

Although the preferred embodiment describes using six rollers on each side of the apparatus, the invention can be used with two stacked rollers on each side, three stacked rollers on each side, four stacked rollers on each side, five stacked rollers on each side or seven or more stacked rollers on each side.

Although, the V-cross-sectional shape of the rollers can be formed by the adjustable spacing between the rows, the V-cross-sectional shape can be formed in other ways. The top rollers can have a smaller diameter than the bottom rollers in each row, or the top rollers can have more coarse or deep grooved surface patterns than the bottom rollers.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. An apparatus for preparing meat comprising:
   a first column of at least two removable rollers;
   a second column of at least two removable rollers adjacent to, parallel to and spaced apart from said first column of rollers;
   means for adjusting the spacing between said first column of rollers and said second column of rollers;
   means for feeding meat between said first and second columns of rollers;
   means for retrieving meat from said first and second columns of rollers;
   finisher roller means for smoothing texture on retrieved meat and making retrieved meat thinner;
   means for adjusting said finisher roller means;
   means for rotating said rollers; and
   a housing for supporting said first and second columns of rollers, said means for feeding meat between said first and second columns of rollers, said means for retrieving meat from said first and second columns of rollers and said means for rotating said rollers.

2. The apparatus for preparing meat as recited in claim 1 wherein said means for adjusting the spacing between said first column of rollers and said second column of rollers comprises adjusting the spacing between each outer corner of said adjacent rollers to form a substantially V-cross-sectional shape.

3. The apparatus for preparing meat as recited in claim 2 wherein said means for adjusting the spacing between said first column of rollers and said second column of rollers further comprises a plurality of threaded shafts with numbers at each corner of an uppermost and lowermost of said rollers in said first column of rollers, wherein each of said threaded shafts with numbers attaches a corner of a roller in said first column of rollers to a corresponding corner of said horizontally adjacent roller in said second column of rollers.

4. The apparatus for preparing meat as recited in claim 1 wherein each of said rollers includes a plurality of triangular shaped, non-sharpened outer teeth.

5. The apparatus for preparing meat as recited in claim 4 wherein at least one of said rollers includes outer teeth sized and shaped larger than said outer teeth of at least one of said lower rollers in said column.

6. The apparatus for preparing meat as recited in claim 1 wherein said means for feeding meat between said first and second columns of rollers comprises a first conveyor belt.

7. The apparatus for preparing meat as recited in claim 6 further comprising a scraper mounted to said first conveyor belt for removing the meat from said first conveyor belt.

8. The apparatus for preparing meat as recited in claim 1 wherein said means for retrieving meat from said first and second columns of rollers comprises a second conveyor belt mounted adjacent the bottom of said first and second columns of rollers.

9. The apparatus for preparing meat as recited in claim 8 further comprising a scraper mounted to said second conveyor belt for removing the meat from said second conveyor belt.

10. The apparatus for preparing meat as recited in claim 8 wherein said finisher roller means is removably mounted above said second conveyor belt, said finisher roller means being structured to further flatten and remove any coarse texture in the meat.

11. The apparatus for preparing meat as recited in claim 10 further comprising a scraper mounted adjacent said finisher roller means for removing the meat from said finisher roller means.

12. The apparatus according to claim 8 including finger wipers pivotally mounted adjacent to at least one said roller to pivot against the at least one said roller and thereby function as a scraper.

13. The apparatus for preparing meat as recited in claim 1 wherein said first and second columns of rollers each include at least three rollers.

14. The apparatus for preparing meat as recited in claim 1 wherein said first and second columns of rollers each include at least six rollers.

15. The apparatus for preparing meat as recited in claim 1 wherein said means for rotating said rollers comprises a removable electrical motor and a plurality of chains interconnecting said motor to said rollers.

16. The apparatus for preparing meat as recited in claim 1 wherein said rollers are constructed of stainless steel.

17. The apparatus for preparing meat as recited in claim 1 wherein said rollers are constructed of plastic.

18. The apparatus for preparing meat as recited in claim 1 wherein said rollers are constructed of aluminum.

19. The apparatus for preparing meat as recited in claim 1 further comprising means for simultaneously installing said rollers.

20. The apparatus for preparing meat as recited in claim 19 wherein said means for simultaneously installing said rollers comprises a draw-shaped cradle having a front panel and a pair of side panels extending out from a rear face of said front panel in generally perpendicular relation thereto, each of said side panels having a plurality of pockets structured and disposed to removably seat a roller therein, said cradle further including means for releasing said rollers after said cradle has been inserted into the apparatus.

21. An apparatus for preparing meat comprising:
a first column of at least two rollers;
a second column of at least two rollers adjacent to, parallel to and spaced apart from said first column of rollers;
means for adjusting the spacing between said first column of rollers and said second column of rollers;
a first conveyor belt mounted adjacent the top of said first and second columns of rollers for feeding meat between said first and second columns of rollers;
a second conveyor belt mounted adjacent the bottom of said first and second columns of rollers for retrieving meat from said first and second columns of rollers;
a removable electrical motor and a plurality of chains interconnecting said motor to said rollers; and
a housing for supporting said first and second columns of rollers, said first and second conveyor belts, said removable electrical motor and said plurality of chains.

22. The apparatus for preparing meat as recited in claim 21 wherein said first and second columns of rollers each include at least three rollers.

23. The apparatus for preparing meat as recited in claim 21 wherein said first and second columns of rollers each include at least six rollers.

24. The apparatus for preparing meat as recited in claim 21 wherein each of said rollers includes a plurality of generally triangular shaped, non-sharpened outer teeth.

25. The apparatus for preparing meat as recited in claim 21 further comprising a scraper mounted to said first conveyor belt for removing the meat from said first conveyor belt.

26. The apparatus for preparing meat as recited in claim 21 further comprising a scraper mounted to said second conveyor belt for removing the meat from said second conveyor belt.

27. The apparatus for preparing meat as recited in claim 21 wherein said rollers are constructed of plastic.

28. The apparatus for preparing meat as recited in claim 21 wherein said rollers are constructed of aluminum.

29. An apparatus for preparing meat comprising:
a first column of at least two rollers;
a second column of at least two rollers adjacent to, parallel to and spaced apart from said first column of rollers;
means for adjusting the spacing between said first column of rollers and said second column of rollers;
a first conveyor belt mounted adjacent the top of said first and second columns of rollers for feeding meat between said first and second columns of rollers;
a second conveyor belt mounted adjacent the bottom of said first and second columns of rollers for retrieving meat from said first and second columns of rollers;
a removable electrical motor and a plurality of chains interconnecting said motor to said rollers;
a housing for supporting said first and second columns of rollers, said first and second conveyor belts, said removable electrical motor and said plurality of chains; and
a finisher roller removably mounted above said second conveyor belt, said finisher roller being structured to further flatten and remove any coarse texture in the meat.

30. The apparatus for preparing meat as recited in claim 29 further comprising a scraper mounted adjacent said finisher roller for removing the meat from said finisher roller.

31. An apparatus for preparing meat comprising:
a first column of at least two rollers;
a second column of at least two rollers adjacent to, parallel to and spaced apart from said first column of rollers;
means for adjusting the spacing between said first column of rollers and said second column of rollers;
a first conveyor belt mounted adjacent the top of said first and second columns of rollers for feeding meat between said first and second columns of rollers;
a second conveyor belt mounted adjacent the bottom of said first and second columns of rollers for retrieving meat from said first and second columns of rollers;
a removable electrical motor and a plurality of chains interconnecting said motor to said rollers; and
a housing for supporting said first and second columns of rollers, said first and second conveyor belts, said removable electrical motor and said plurality of chains;
and means for simultaneously installing said rollers.

32. The apparatus for preparing meat as recited in claim 31 wherein said means for simultaneously installing said rollers comprises a draw-shaped cradle having a front panel and a pair of side panels extending out from a rear face of said front panel in generally perpendicular relation thereto, each of said side panels having a plurality of pockets structured and disposed to removably seat a roller therein, said cradle further including means for releasing said rollers after said cradle has been inserted into the apparatus.

* * * * *